United States Patent
Masuda

(10) Patent No.: US 8,332,642 B2
(45) Date of Patent: Dec. 11, 2012

(54) MONITOR PORTAL, MONITOR SYSTEM, TERMINAL AND COMPUTER READABLE MEDIUM THEREOF

(75) Inventor: Yoshihiro Masuda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 240 days.

(21) Appl. No.: 12/909,269

(22) Filed: Oct. 21, 2010

(65) Prior Publication Data

US 2011/0307696 A1 Dec. 15, 2011

(30) Foreign Application Priority Data

Jun. 15, 2010 (JP) ................. 2010-135795

(51) Int. Cl.
*H04L 9/00* (2006.01)
(52) U.S. Cl. ....................... 713/168; 709/224
(58) Field of Classification Search ............. 713/151, 713/156, 168; 709/224–226; 726/22
See application file for complete search history.

(56) References Cited

U.S. PATENT DOCUMENTS

| | | | | |
|---|---|---|---|---|
| 7,945,747 B2* | 5/2011 | Kataoka et al. | ............... | 711/159 |
| 8,010,719 B2* | 8/2011 | Moriki et al. | .................. | 710/40 |
| 8,239,557 B2* | 8/2012 | McCune et al. | ............... | 709/230 |
| 2002/0152292 A1 | 10/2002 | Motoyama et al. | | |
| 2007/0143753 A1* | 6/2007 | Vasile | ............... | 718/1 |
| 2009/0259740 A1* | 10/2009 | Hepburn | ........................ | 709/223 |
| 2010/0145872 A1* | 6/2010 | Chae et al. | ..................... | 705/346 |
| 2010/0268816 A1* | 10/2010 | Tarui et al. | ..................... | 709/224 |
| 2011/0178989 A1* | 7/2011 | Watanabe et al. | ............. | 707/649 |

FOREIGN PATENT DOCUMENTS

| | | |
|---|---|---|
| JP | 2002-41376 A | 2/2002 |
| JP | 2002-84326 A | 3/2002 |
| JP | 2002-297461 A | 10/2002 |
| JP | 2003-323360 A | 11/2003 |
| JP | 2004-287855 A | 10/2004 |

\* cited by examiner

*Primary Examiner* — Beemnet Dada
(74) *Attorney, Agent, or Firm* — Sughrue Mion, PLLC

(57) ABSTRACT

A monitor portal includes: a position information acquisition unit that acquires position information representing a position of a terminal connected to a communication network on the communication network; a command unit that commands a virtual server control unit that generate a plurality of virtual servers from at least one physical server connected to the communication network and control the virtual servers to generate the virtual servers based on the position information; and a transmission unit that transmits a program for causing the virtual server to function as a monitor unit for acquiring a state signal from the terminal based on the position information to the virtual server so that the virtual server executes the program.

10 Claims, 22 Drawing Sheets

| IP NETWORK ADDRESS | IP HOST ADDRESS | SERVER ADDRESS |
|---|---|---|
| A | a | X |
| A | b | Y |
| A | c |  |
| ⋮ | ⋮ | ⋮ |

FIG. 14

| IP NETWORK ADDRESS | IP HOST ADDRESS | SERVER ADDRESS | MANAGEMENT SERVER ADDRESS |
|---|---|---|---|
| A | a | X | X |
| | b | Y | |
| | c | | |
| | ⋮ | | |
| B | | | |
| ⋮ | ⋮ | ⋮ | ⋮ |

# MONITOR PORTAL, MONITOR SYSTEM, TERMINAL AND COMPUTER READABLE MEDIUM THEREOF

CROSS-REFERENCE TO RELATED APPLICATION

This application is based on and claims priority under 35 USC 119 from Japanese Patent Application No. 2010-135795 filed on Jun. 15, 2010.

BACKGROUND

Technical Field

This invention relates to a monitor portal, a monitor system, a terminal, and computer readable medium thereof.

SUMMARY

According to an aspect of the invention, a monitor portal includes:

a position information acquisition unit that acquires position information representing a position of a terminal connected to a communication network on the communication network;

a command unit that commands a virtual server control unit that generate a plurality of virtual servers from at least one physical server connected to the communication network and control the virtual servers to generate the virtual servers based on the position information; and a transmission unit that transmits a program for causing the virtual server to function as a monitor unit for acquiring a state signal from the terminal based on the position information to the virtual server so that the virtual server executes the program.

BRIEF DESCRIPTION OF THE DRAWINGS

Exemplary embodiments of the invention will be described in detail based on the following figures, wherein:

FIG. 14 is a drawing to describe a format stored in storage means in a second exemplary embodiment of the invention;

DETAILED DESCRIPTION

Figure 1:
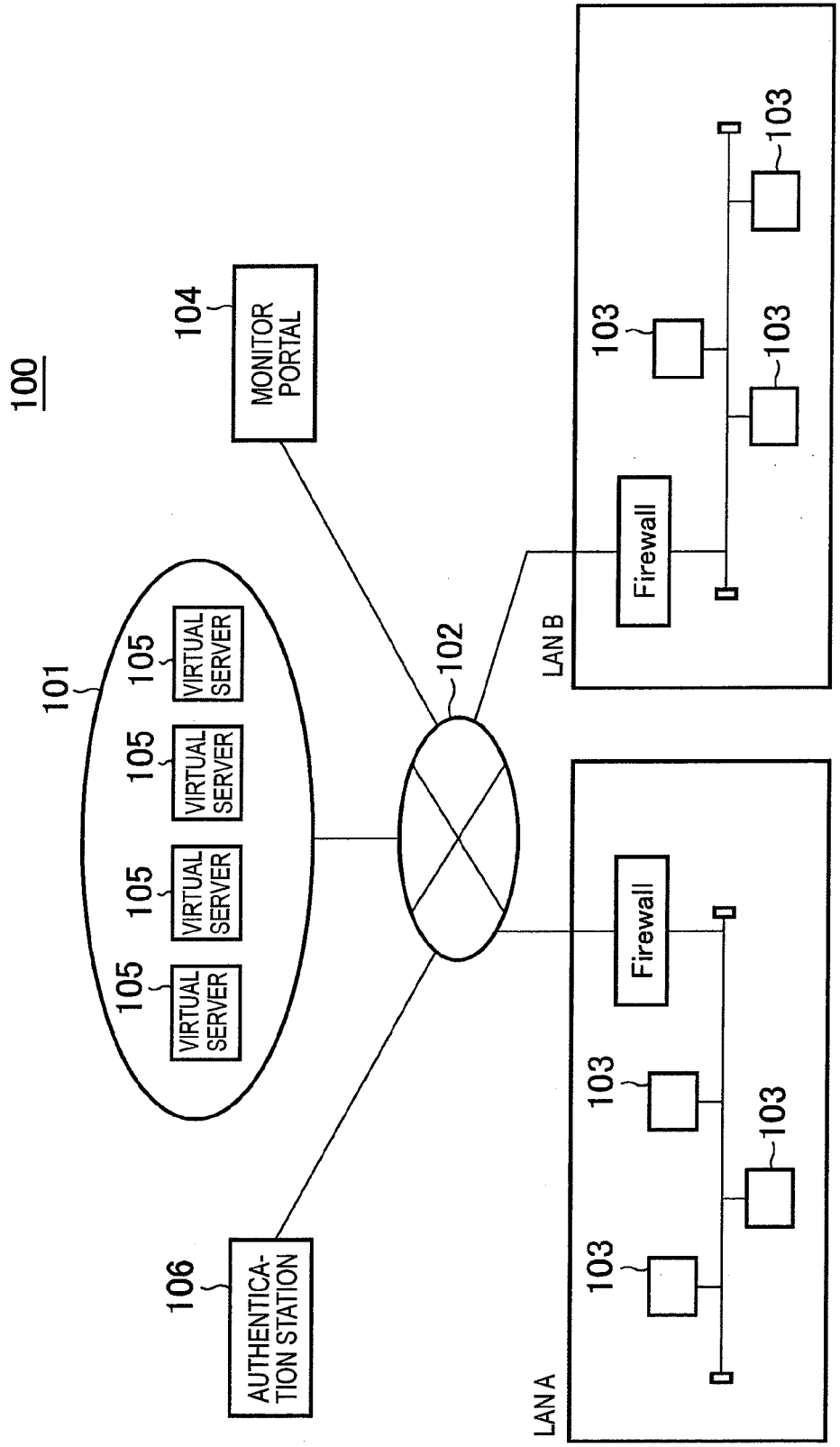
FIG. 1 is a drawing to describe a monitor system in a first exemplary embodiment of the invention.

Exemplary embodiments of the invention will be discussed below with reference to the accompanying drawings: Identical or similar elements are denoted by the same reference numerals in the drawings and duplicate description is omitted.

[First Exemplary Embodiment]

FIG. 1 is a drawing to describe a monitor system 100 in a first exemplary embodiment of the invention. As shown in FIG. 1, the monitor system 100 in the exemplary embodiment has a cloud computing platform 101, local area networks (LANs) A and B managed by independent organizations (for example, enterprises, departments in an enterprise, etc.,), and Internet 102 for connecting them.

In FIG. 1, as a specific example of the LANs, LAN A managed by organization A and LAN B managed by organization B are connected to the cloud computing platform 101 through the Internet 102.

Plural of terminals 103 used by the users belonging to the organization are connected to each of the LANs A and B. The terminal 103 is, for example, a copier, a multiple function device having a copy function and a function of scanning data and transmitting the data to another terminal 103, a personal computer, etc. A firewall for preventing intrusion to the inside from the outside of the LAN A, B is installed in each of the LANs A and B.

Plural of virtual servers 105 are virtually provided in the cloud computing platform 101. In FIG. 1, a monitor portal 104 is provided separately from the virtual servers 105, but one virtual server 105 may be caused to function as the monitor portal 104. The virtual server 105 is described later in detail. An authentication station 106 for issuing a server certificate (described later) is connected to the Internet 102.

Figure 2:
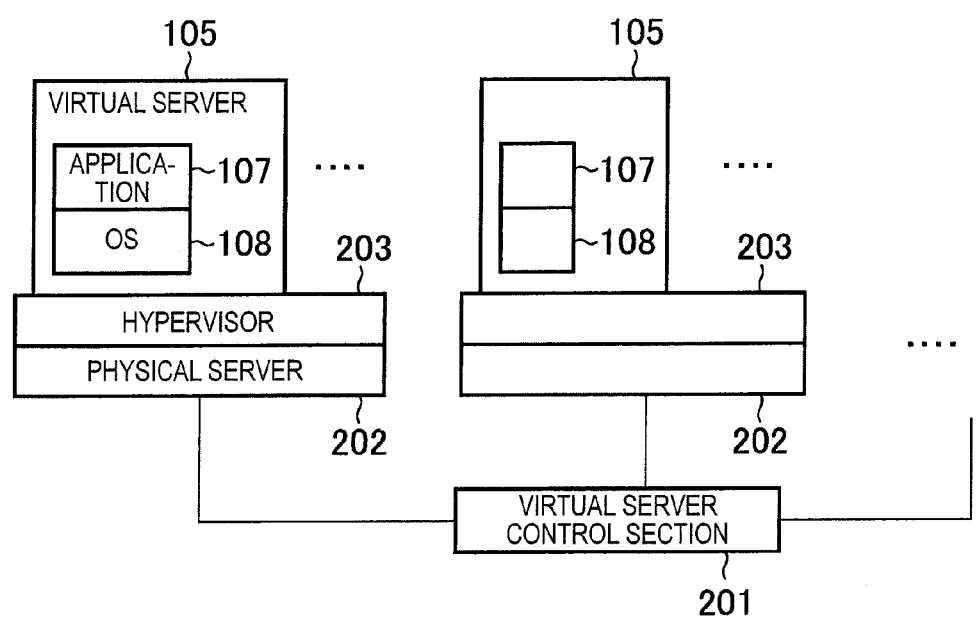
FIG. 2 is a drawing to describe a cloud computing platform shown in FIG. 1.

FIG. 2 is a drawing to describe the cloud computing platform shown in FIG. 1. As shown in FIG. 2, the cloud computing platform 2 includes a virtual server control section 201 and a physical server group 202 connected to the virtual server control section 201. The cloud mentioned here is a use mode of computers based on a network and refers to use of computer processing via the network as service by the user.

As shown in FIG. 2, a hypervisor 203 is provided on each physical server 202 and one or more virtual servers 105 are booted on the hypervisor 203. The hypervisor 203 is software for booting and controlling VM, here the virtual server 105 on each machine, here each physical server 202 without requirement of aid of a general-purpose OS. VM is provided by virtually creating a set of a CPU and memory as known. Each physical server 202 is a computer made up of a CPU, memory, etc., needless to say.

Each virtual server 105 has an OS 108 and an application 107 and the above-mentioned program corresponds to one application 107.

The virtual server control section 201 generates one or more virtual servers 105 on the physical server 202. Specifically, this is performed by allocating resources (for example, the CPU processing time, the memory capacity, etc.,) of the physical server to the virtual server 105 through the hypervisor 203 and controlling. That is, installation and execution of a program in the virtual server 105 described later are actually performed by the physical server 202. For example, plural of programs containing the program in the exemplary embodiment are stored in a record section of memory, etc., in the physical server 202 and the program in the exemplary embodiment is actually executed by one or more CPUs of the physical server 202. At this time, one or more CPUs of the physical server 202 may also be used for the plurality of program mentioned above; for example, the processing time of one or more CPUs is divided and a part is allocated to execution of the program in the exemplary embodiment, etc.

Next, the configurations of the monitor portal 104, the virtual server control section 201, the virtual server 105, the terminal 103, and the authentication station 106 will be discussed functionally. Each of the monitor portal 104, the virtual server control section 201, the virtual server 105, the terminal 103, and the authentication station 106 is implemented as a computer including a CPU and memory. The CPU is a processing unit for executing a program stored in the memory, controls sections described later, and implements functions described later. The memory stores programs and data for carrying out the exemplary embodiment.

The functions are implemented by executing the program stored in memory, for example. The program may be downloaded through the Internet 102 or may be provided using any of various computer-readable information record media of a CD-ROM, a DVD-ROM, etc., for example.

Each of the monitor portal 104, the virtual server control section 201, the virtual server 105, the terminal 103, and the authentication station 106 may include an input/output section of a keyboard, a mouse, etc., a display section of a CRT, a liquid crystal display, etc., and a record section of a hard disk, a CD-ROM, etc., in addition to the CPU and the memory, needless to say. The CPU, the memory, etc., of the virtual server 105 is realized by the virtually allocated resources of the physical server 202 by the virtual server control section 201.

Figure 3:
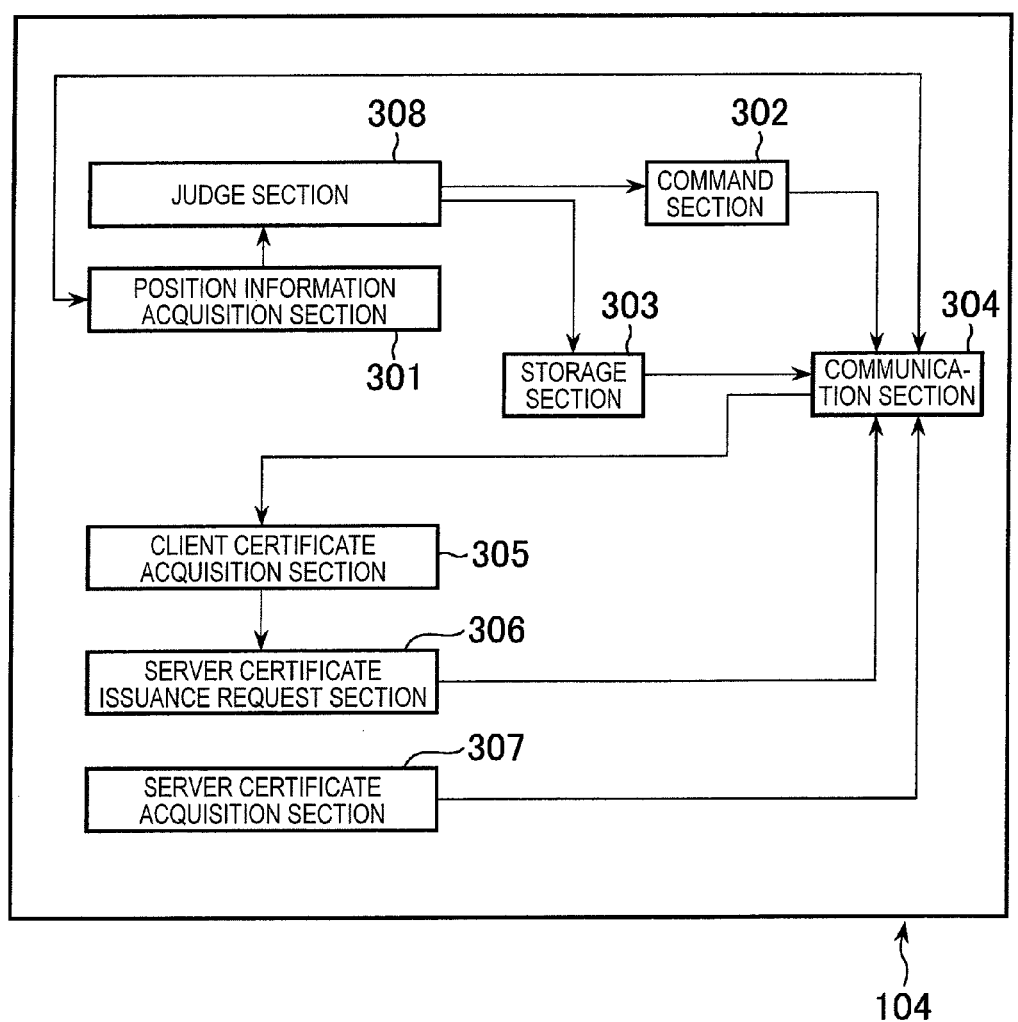
FIG. 3 is a drawing to functionally describe the configuration of a monitor portal in the first exemplary embodiment of the invention.

FIG. 3 is a drawing to functionally describe the configuration of the monitor portal 104. As shown in FIG. 3, the monitor portal 104 functionally is made up of a position information acquisition section 301, a command section 302, a storage section 303, a communication section 304, a client certificate acquisition section 305, a server certificate issuance request section 306, a server certificate acquisition section 307, and a determination section 308.

The communication section 304 allows the monitor portal 104 to communicate with the cloud computing platform 101, the authentication station 106, and the terminal 103 through the Internet 102.

The position information acquisition section 301 acquires position information indicating the position of the terminal 103 on a communication network, for example, IP address. Specifically, for example, the IP address of the terminal 103 assigned when the terminal 103 is connected to the LAN is transmitted through the Internet 102, whereby the position information acquisition section 301 acquires the IP address. The IP address is made up of an IP network address and an IP host address, needless to say. The position information may be a subnet address, a domain name, a router outside address of the LAN where the terminal is installed, enterprise ID where the terminal is installed, a MAC address of the terminal, or a serial number of the terminal in addition to the IP address. The enterprise ID where the terminal is installed and the serial number of the terminal are entered by the user. The communication network includes the cloud computing platform 101, the Internet 102, and the LAN.

The storage section 303 stores the position information of the terminal acquired as described above. The storage section 303 also stores the address of the virtual server 105 generated corresponding to the terminal 103 (described later) in association with the IP network address and the IP host address of the corresponding terminal 103 as shown in FIG. 4.

Figures 4, 5:
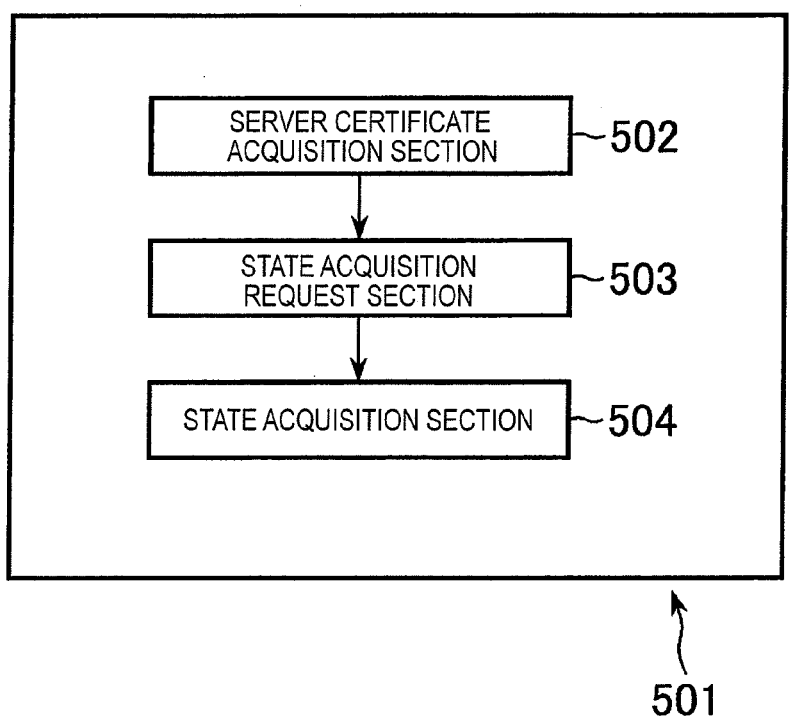
FIG. 4 is a drawing to describe a format stored in storage means in the first exemplary embodiment of the invention.
FIG. 5 is a drawing to functionally describe the configuration of a virtual server in the first exemplary embodiment of the invention.

Specifically, for example, as shown in FIG. 4, the storage section 303 stores IP network address A to be monitored, IP host address a of the terminal 103, and server address X of the generated virtual server in association with each other. In other words, in the example in FIG. 4, the terminals 103 having IP host addresses a and b correspond to the virtual servers having server addresses X and Y respectively.

In FIG. 3, for simplicity, the position information is described using A, a, X, etc., about each address; in fact, however, for example, the IP address of a combination of A and a and the server address X are each 32-bit information, needless to say.

Further, although not shown in FIG. 4, the storage section 303 stores a program for causing the virtual server 105 described later to function as a monitor section of the corresponding terminal 103. Further, the storage section 303 stores the IP network address of the LAN to be monitored.

The determination section 308 determines whether or not the position information stored in the storage section 303 is position information in the LAN to be monitored and whether or not position information of the terminal 103 detected by a terminal 103 detection section differs. If it is determined that the position information is position information in the LAN to be monitored and the position information differs, the storage section 303 newly stores position information of the terminal 103.

If the determination section 308 determines that the position information stored in the storage section 303 differs from position information of the terminal 103 whose position information is acquired, the command section 302 commands the virtual server control section 201 to generate the virtual server 105 for monitoring the terminal 103 described later. The command section 302 transmits a program for causing the virtual server 105 described later as a monitor section of the corresponding terminal 103 to the virtual server 105 through the communication section 304.

If it is determined that the position information stored in the storage section 303 contains the same position information as position information of the terminal 103 whose position information is acquired, the processing described above is not performed.

The client certificate acquisition section 305 acquires a client certificate transmitted from the terminal installed in the LAN through the communication section 304. The client certificate may be a message digest.

The server certificate issuance request section 306 acquires the client certificate from the client certificate acquisition section 305. The server certificate issuance request section 306 transmits certificate application data containing the server address of the virtual server 105 generated corresponding to the terminal 103 and the client certificate to the authentication station 106 through the communication section 304 and requests the authentication station 106 to issue a server certificate described later.

The server certificate acquisition section 307 acquires the server certificate generated in the authentication station 106 in response to the server certificate issuance request through the communication section 304. The server certificate refers to the certificate application data on which the authentication station 106 places an electronic signature (described later in detail).

FIG. 5 is a drawing to functionally describe the configuration of the monitor server 501 generated by the virtual server 105. The function is implemented by installing and executing a program acquired from the monitor portal 104.

As shown in FIG. 5, the monitor server 501 has a server certificate acquisition section 502, a state acquisition request section 503, and a state acquisition section 504. The server certificate acquisition section 502 acquires the server certificate transmitted from the authentication station 106 through the Internet.

The state acquisition request section 503 transmits a state acquisition request together with the acquired server certificate to the terminal 103. The state acquisition section 504 acquires state information of the terminal 103 transmitted from the terminal 103 in response to the state acquisition request.

Figure 6:
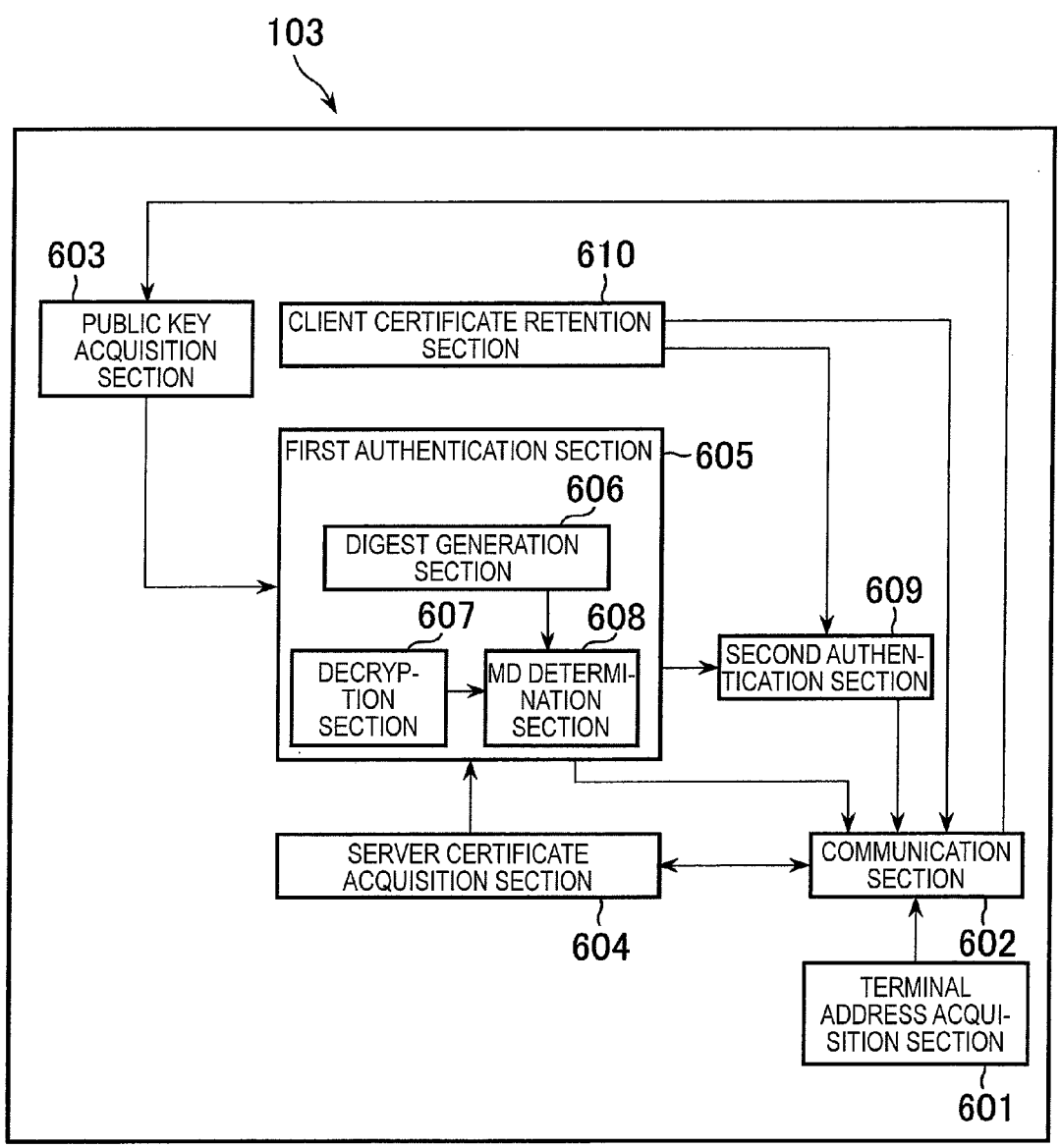
FIG. 6 is a drawing to functionally describe the configuration of a terminal in the first exemplary embodiment of the invention.

FIG. 6 is a drawing to functionally describe the configuration of the terminal 103. As shown in FIG. 6, the terminal 103 functionally has a terminal address acquisition section 601, a communication section 602, a client certificate retention section 610, a public key acquisition section 603, a server certificate acquisition section 604, a first authentication section 605, and a second authentication section 609.

The terminal address acquisition section 601 acquires position information assigned to the terminal 103 in the LAN, for example, the IP address and also transmits the position information to the position information acquisition section 301 of the monitor portal 104 through the communication section 602. The position information corresponds to the IP network address and the IP host address, for example, shown in FIG. 4. The communication section 602 communicates with the monitor portal 104, etc., through the Internet.

The monitor portal 104 previously acquires the server certificate from the authentication station 106 and authentication using the server certificate is conducted whenever communications are conducted in the communications described above and later and validity of the monitor portal 104 is guaranteed, needless to say.

The client certificate retention section 610 retains a client certificate. The client certificate retention section 610 transmits the client certificate to the client certificate acquisition section 305 of the monitor portal 104 through the communication section 602.

The public key acquisition section 603 acquires a public key transmitted from the authentication station 106 through the communication section 602.

The server certificate acquisition section 604 acquires a state acquisition request from the monitor portal 104 and the server certificate transmitted from the virtual server 105 through the communication section 304 and transmits them to the first authentication section 605.

The first authentication section 605 has a digest generation section 606, a decryption section 607, and an MD determination section 608. The digest generation section 606 calculates a first digest from the certificate application data contained in the server certificate acquired by the server certificate acquisition section 604.

The decryption section 607 decrypts the signature of the authentication station 106 contained in the server certificate using the public key of the authentication station 106 and acquires a second digest.

The MD determination section 608 determines whether or not the first digest and the second digest match, thereby determining validity of the virtual server 105. If it is determined that the virtual server 105 is not valid, processing is terminated, for example. In this case, the user of the terminal 103 may be informed that the virtual server 105 is not valid as warning, etc.

On the other hand, the first authentication section 605 determines that the virtual server 105 is valid, the second authentication section 609 determines whether or not the client certificate retained in the client certificate retention section 610 and the client certificate contained in the certificate application data match, thereby determining whether or not the monitor server 501 is generated to monitor the terminal 103.

If the second authentication section 609 determines that the virtual server 105 is the monitor server 501 generated to monitor the terminal 103, a state signal representing the state of the terminal 103 is transmitted to the corresponding virtual server 105. On the other hand, if the second authentication section 609 determines that the virtual server 105 is not the monitor server 501 generated to monitor the terminal 103, processing is terminated, for example. In this case, the user of the terminal 103 may be informed of the fact as warning, etc.

Figure 7:
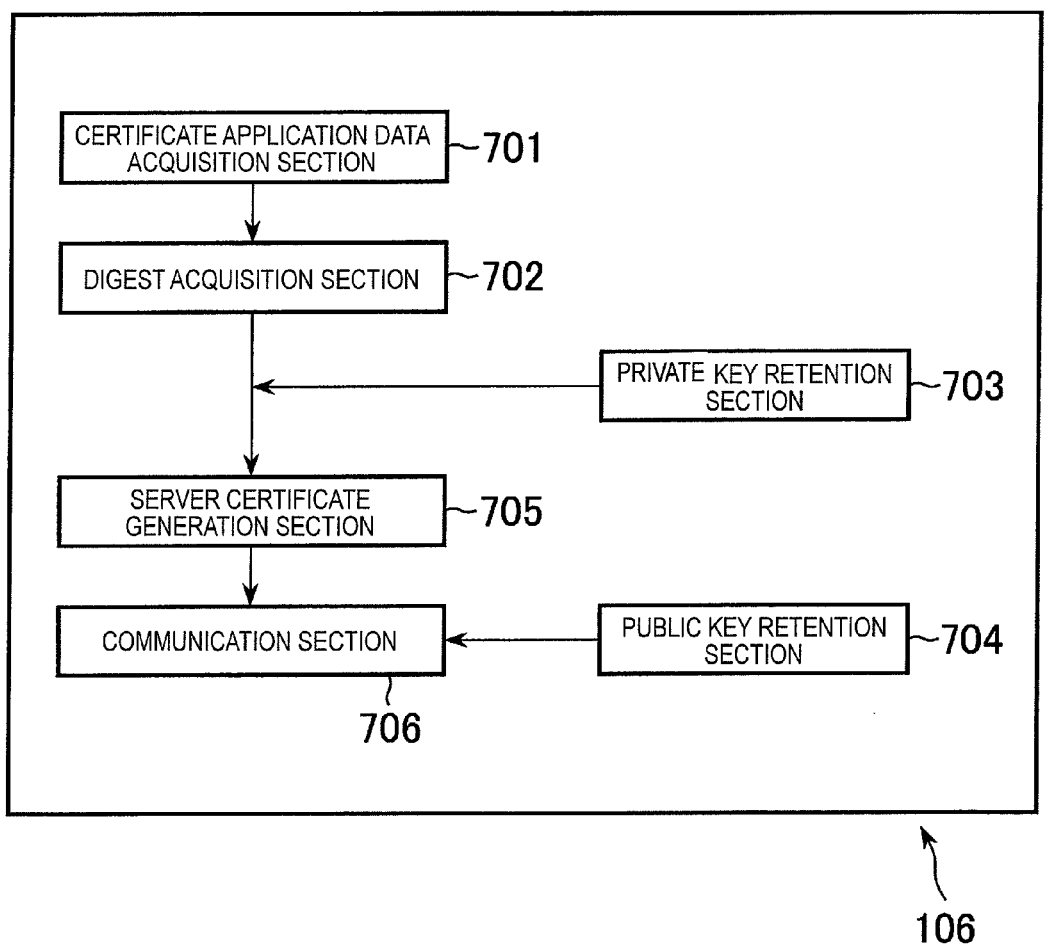
FIG. 7 is a drawing to functionally describe the configuration of an authentication station in the first exemplary embodiment of the invention.

FIG. 7 is a drawing to functionally describe the configuration of the authentication station 106. As shown in FIG. 7, the authentication station 106 has a certificate application data acquisition section 701, a digest acquisition section 702, a private key retention section 703, a public key retention section 704, a server certificate generation section 705, and a communication section 706.

The certificate application data acquisition section 701 acquires certificate application data from the monitor portal 104. The digest acquisition section 702 calculates a digest from the certificate application data acquired from the certificate application data acquisition section 701.

The private key retention section 703 and the public key retention section 704 retain a private key and a public key respectively. The private key and the public key are a pair, needless to say.

The server certificate generation section 705 acquires the digest calculated in the digest acquisition section 702. The server certificate generation section 705 encrypts the digest using the private key, thereby placing a signature and generates a server certificate containing the certificate application data and the signature of the authentication station 106.

The communication section 706 transmits the server certificate to the monitor portal 104. The communication section 706 transmits the public key acquired from the public key acquisition section 603 to the terminal 103.

Figure 8:
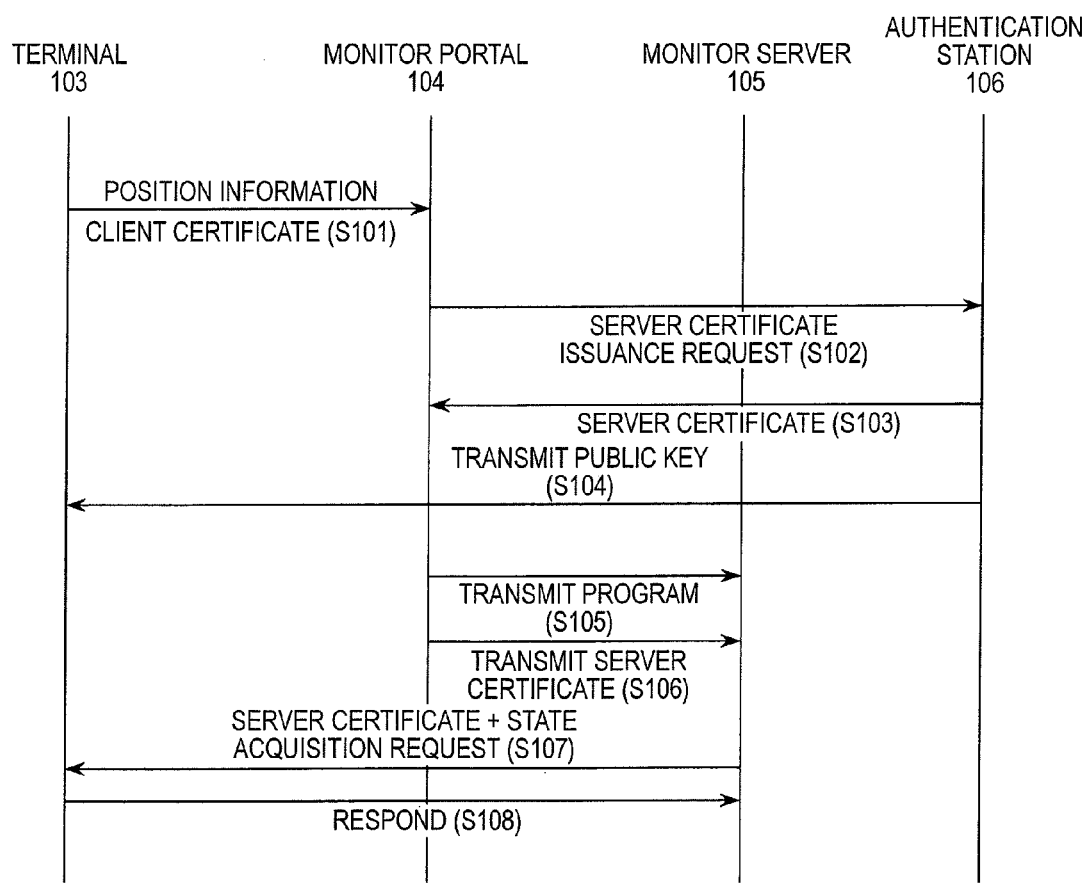
FIG. 8 is a drawing to describe an outline of a sequence as the whole monitor system in the first exemplary embodiment of the invention.

Next, an outline of a sequence as the whole monitor system 100 will be discussed. As shown in FIG. 8, when connection of the terminal 103 to the LAN is detected, the terminal 103 transmits the client certificate and the position information of the terminal 103 to the monitor portal 104 (S101). At S101, the client certificate and the position information are transmitted at the same time, but may be transmitted in order. In this case, they may be transmitted in any order.

Upon reception of the client certificate, the monitor portal 104 requests the authentication station 106 to issue a server certificate (S102). Specifically, the monitor portal 104 requests the authentication station 106 to issue a server certificate based on the certificate application data containing the server address of the virtual server 105 generated corresponding to the terminal 103 and the client certification.

Upon reception of the server certificate issuance request, the authentication station 106 transmits the server certificate to the monitor portal 104 (S103). Specifically, the authentication station 106 places an electronic signature on the certificate application data received from the monitor portal 104 using the private key of the office station 106. The authentication station 106 transmits the certificate application data on which the signature is placed to the monitor portal 104. This means that the server certificate has the signature of the authentication station 106 in addition to the certificate application data. The authentication station 106 transmits the public key to the terminal 103 (S104).

Upon reception of the server certificate, the monitor portal 104 commands the virtual server control section 201 to generate the virtual server 105 corresponding to the terminal 103 and transmits a program for monitoring the terminal 103 to the virtual server 105 (S105). After the virtual server 105 installs and executes the program, the monitor portal 104 transmits the server certificate to the monitor server 501 (S106).

The virtual server 105 transmits the server certificate and requests the terminal 103 to transmit the state of the terminal 103 (S107). The terminal 103 authenticates the server certificate as described above. If the terminal 103 determines that the server certificate is valid, the terminal 103 transmits a state signal representing the state of the terminal 103 to the virtual server 105 (S108). The processing at 107 and 108 are repeated later. The processing may be performed by asynchronous communications by so-called Comet, for example, and only when a change occurs in the terminal 103, response may be made (S108).

The processing described above will be discussed in more detail with reference to flows of the monitor portal 104, the terminal 103, the monitor server 501, and the authentication station 106. Each of the flows described later may be executed in a different order so long as the same function and effect and object as the flow described later are accomplished, needless to say. The monitor server 501 corresponds to the virtual server 105 in which the program for functioning as a monitor server in the virtual server 105 is installed and executed.

Figure 9:
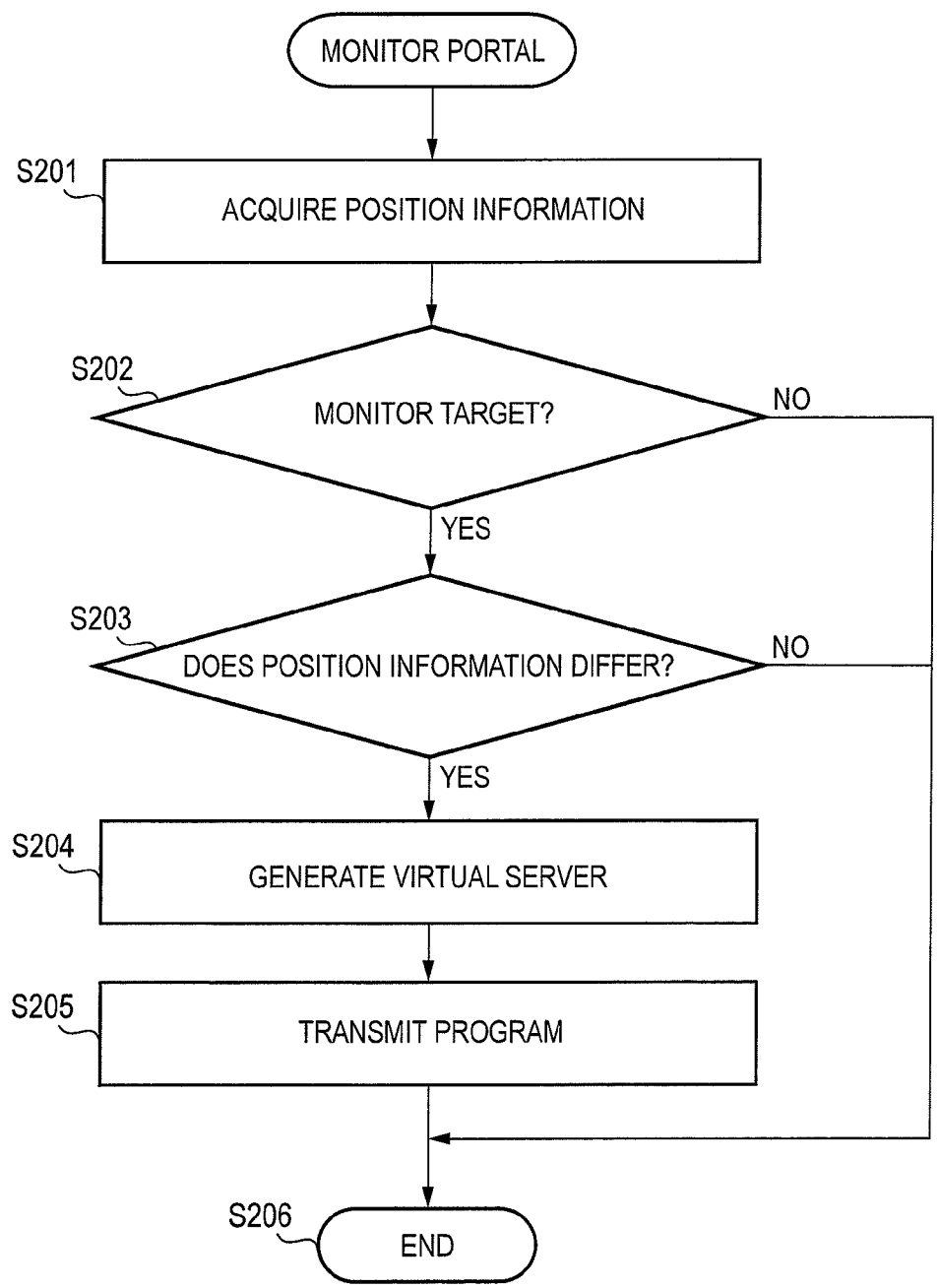
FIG. 9 is a flowchart to describe a flow of the monitor portal when a virtual server is generated in the first exemplary embodiment of the invention.

To begin with, a flow of the monitor portal 104 when the virtual server 105 is generated will be discussed with FIG. 9.

The position information acquisition section 301 acquires the position information of the terminal 103 installed in the LAN (S201). Specifically, the position information acquisition section 301 acquires, for example, the IP network address and the IP host address through the communication section 304.

Next, the determination section 308 determines whether or not the terminal 103 is installed in the LAN to be monitored based on the position information of the terminal 103 (S202). Specifically, for example, the determination is made based on whether or not the IP network address contained in the position information of the terminal 103 matches the IP network address of the LAN previously registered as the monitor target.

If it is determined that the terminal 103 is installed in the LAN to be monitored, further the determination section 308 determines whether or not the acquired position information of the terminal 103 differs from the position information of the terminal 103 stored in the storage section 303 (S203).

Specifically, the case where the IP host address c of the terminal 103, for example, in FIG. 4 is acquired as the position information by the position information acquisition section 301 of the monitor portal 104 will be discussed. As the position information of the terminal 103, the address representing LAN A and the IP host addresses a and b are stored in the storage section 303. Since the IP host address c differs from a or b, it is determined that the position information differs.

If the determination section 308 determines that the position information differs, the command section 302 commands the virtual server control section 201 to generate the virtual server 105 corresponding to the terminal 103 and transmits a program for causing the virtual server 105 as the monitor server 501 to the virtual server 105 (S204 and S205). A newly generated server address of the virtual server 105 is newly stored in the storage section 303 in association with the position information of the terminal 103. Next, the processing is terminated (S206).

On the other hand, if it is determined that the terminal 103 is not installed in the LAN to be monitored or if the position information is the same position information as already stored in the storage section 303, for example, in FIG. 4, if the position information of newly installed terminal 103 is IP host address a, the processing is terminated (S206).

Next, from the viewpoint of authentication, flows of the terminal 103, the virtual server 105, the authentication station 106, and the monitor portal 104 will be discussed.

Figure 10:
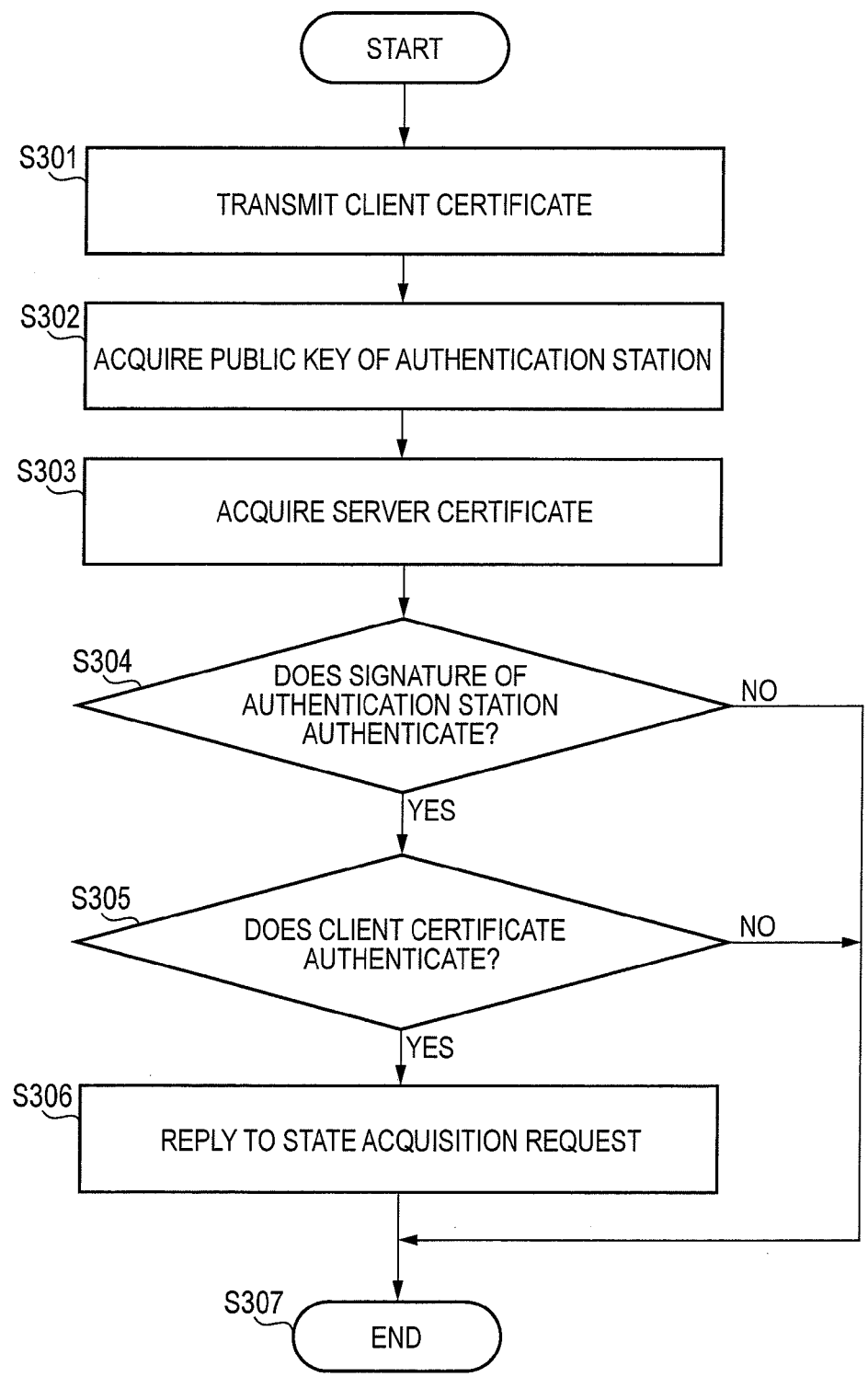
FIG. 10 is a flowchart to describe a processing flow of the terminal concerning authentication in the first exemplary embodiment of the invention.

FIG. 10 is a flowchart to describe a processing flow of the terminal 103 concerning authentication. As shown in FIG. 10, first the terminal 103 transmits the client certificate retained in the client certificate retention section 610 to the monitor portal 104 through the communication section 602 of the terminal 103.

The public key acquisition section 603 acquires the public key transmitted from the authentication station 106 through the communication section 602 of the terminal 103 (S302).

The server certificate acquisition section 307 acquires the server certificate from the authentication station 106 through the communication section. At this time, the server certificate may contain a request for acquiring the state of the terminal 103. It may also contain a command from the virtual server 105.

The first authentication section 605 authenticates the signature of the authentication office 106 and determines whether or not the virtual server 105 transmitting the server certificate is valid (S304). If it is determined that the virtual server 105 is not valid, the processing is terminated (S307).

On the other hand, if it is determined that the virtual server 105 is valid, the second authentication section 609 authenticates the client certificate contained in the server certificate and determines whether or not the virtual server 105 is generated to monitor the terminal 103 (S305).

If it is determined that the virtual server 105 is generated to monitor the terminal 103, a replay representing the state of the terminal 103 is made to the state acquisition request from the virtual server 105 (S306). If a command is contained, the command may be executed together with or in place of S206. Next, the processing is terminated (S307).

On the other hand, if it is determined that the virtual server 105 is not generated to monitor the terminal 103, the processing is terminated (S307).

Figure 11:
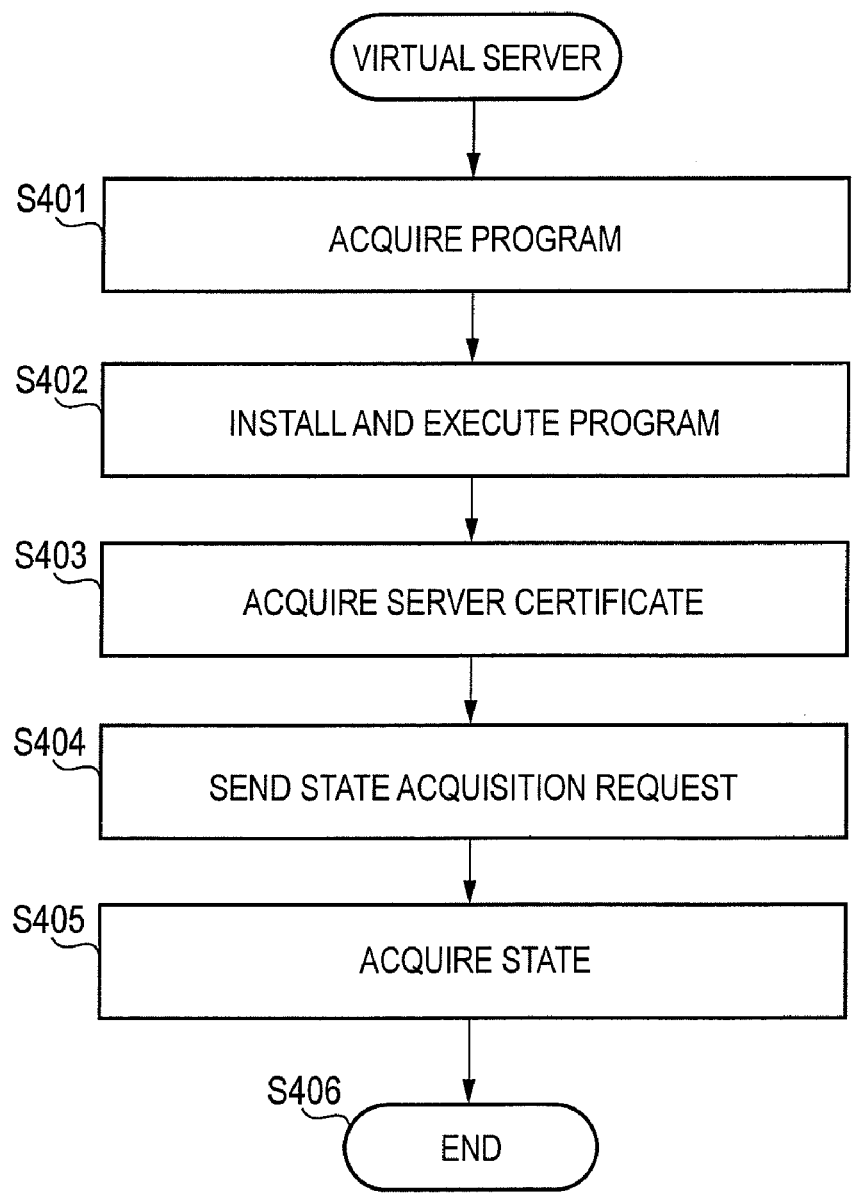
FIG. 11 is a flowchart to describe a processing flow of the virtual server concerning authentication of the virtual server in the first exemplary embodiment of the invention.

FIG. 11 is a flowchart to describe a processing flow of the virtual server 105 concerning authentication. As shown in FIG. 11, the virtual server 105 acquires a program for causing the virtual server 105 as the monitor server 501 from the monitor portal 104 (S401).

The virtual server 105 installs and executes the program (S402). The server certificate acquisition section 502 acquires the server certificate from the monitor portal 104 (S403). As described above, the server certificate is the certificate application data containing the client certificate and the server address of the virtual server 105 on which the authentication office 106 places a signature.

The state acquisition section 504 transmits a state acquisition request to the corresponding terminal 103. The server certificate is added to the state acquisition request as described above (S404). The state acquisition section 504 acquires the state of the terminal 103 transmitted from the terminal 103 (S405). The processing at 5404 and 5405 is repeated as described above. Next, the processing is terminated (S406).

Figure 12:
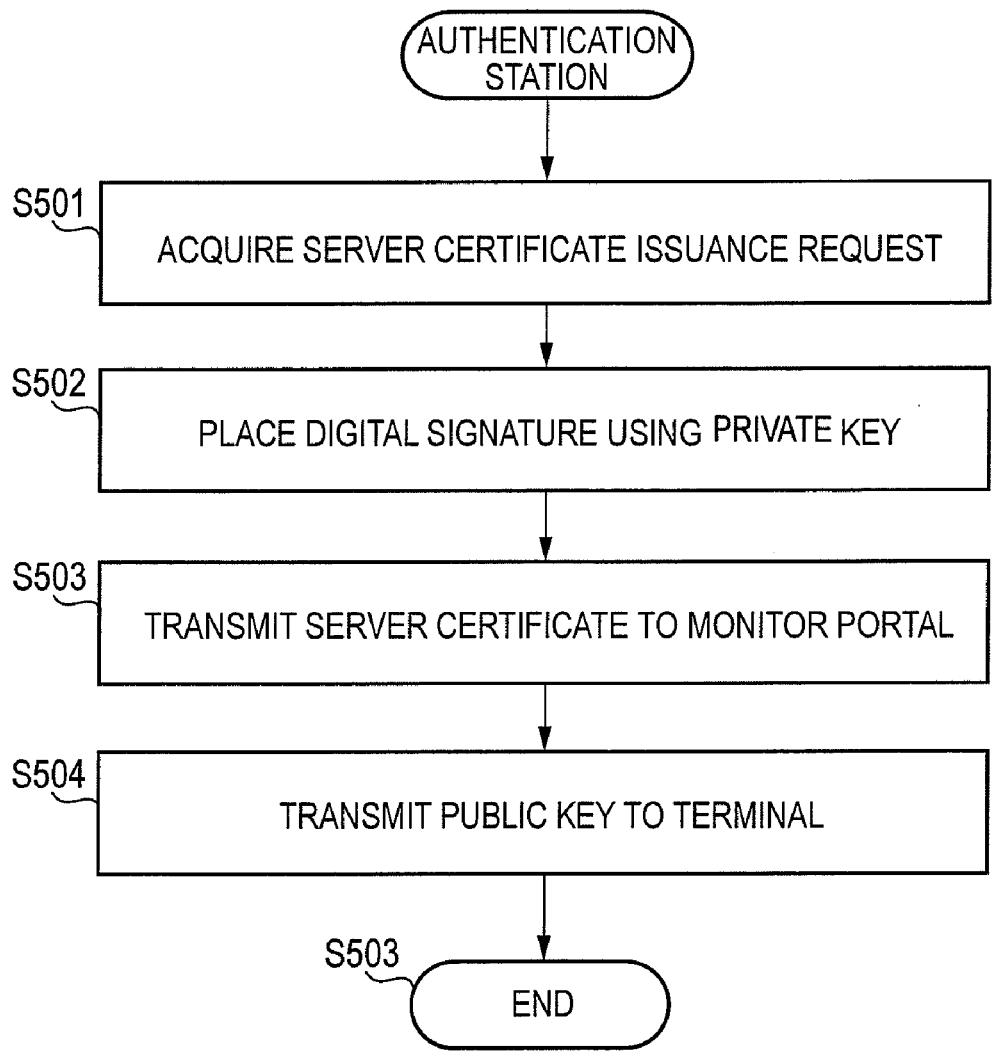
FIG. 12 is a flowchart to describe a processing flow of the authentication station in the first exemplary embodiment of the invention.

FIG. 12 is a flowchart to describe a processing flow of the authentication station 106. As shown in FIG. 12, first a server certificate issuance request is acquired from the monitor portal 104 (S501). Specifically, the certificate application data acquisition section 701 acquires certificate application data contained in the server certificate issuance request.

A signature is placed on the certificate application data using the private key retained in the private key retention section 703 of the authentication station 106 and a server certificate is generated (S502). Specifically, the digest calculated and acquired by the digest acquisition section 702 based on the certificate application data is encrypted using the private key retained in the private key retention section 703, thereby generating the server certificate.

The generated server certificate is transmitted to the monitor portal 104 through the communication section 706 (S503). The public key retained in the public key retention section 704 is transmitted to the terminal 103 through the communication section 706 (S504). The processing is terminated.

Figure 13:
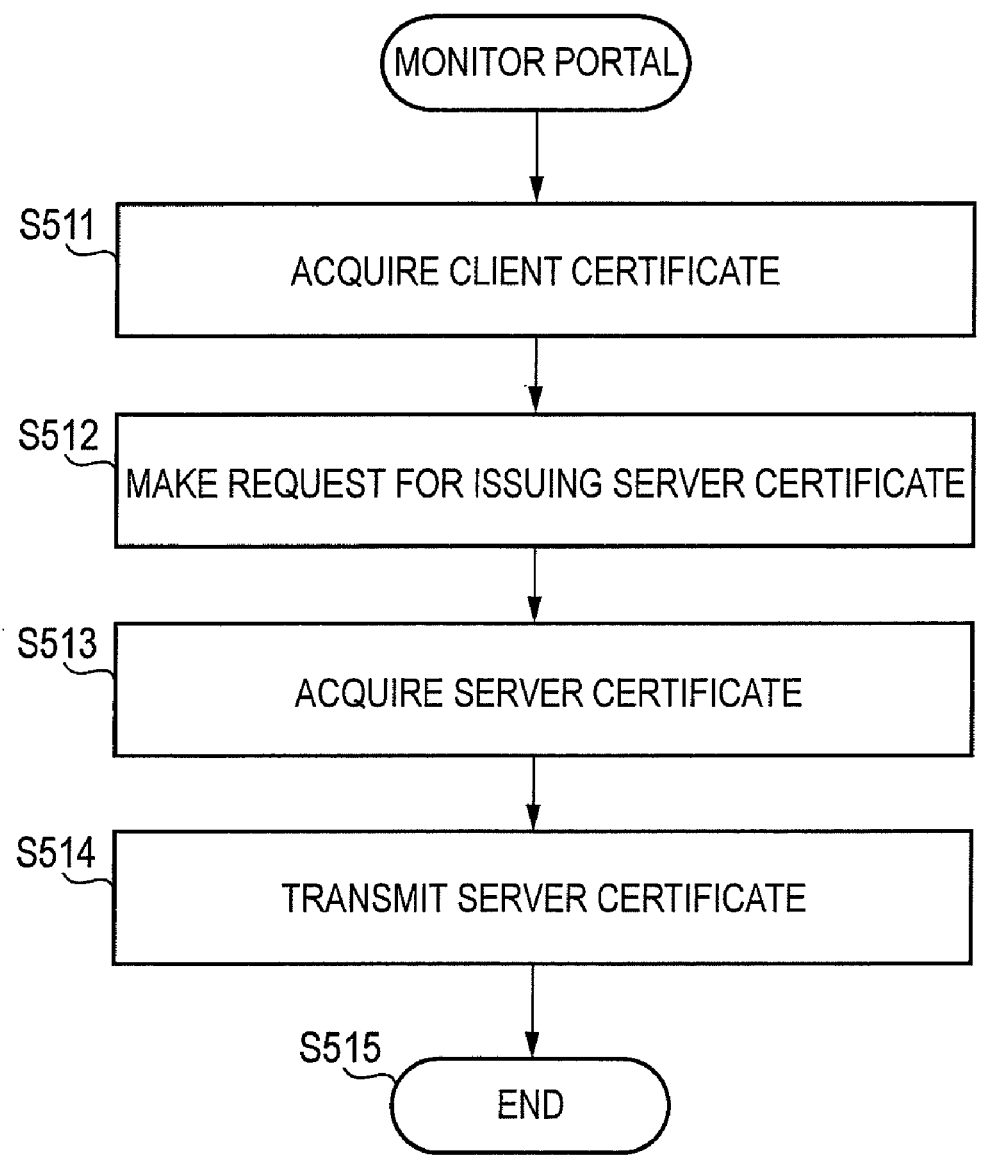
FIG. 13 is a flowchart to describe a processing flow of the monitor portal concerning authentication of the virtual server in the first exemplary embodiment of the invention.

FIG. 13 is a flowchart to describe a processing flow of the monitor portal 104 concerning authentication of the virtual server 105. As shown in FIG. 13, the client certificate acquisition section 305 acquires client certificate from the terminal 103 (S511).

The server certificate issuance request section 306 transmits the certificate application data containing the server address of the virtual server 105 generated in the client certificate to the authentication station 106, thereby making a request for issuing the server certificate.

The server certificate acquisition section 307 acquires the server certificate issued by the authentication station 106 and transmits the server certificate to the generated virtual server 105 (S513 and S514). The processing is terminated (S515).

As described above, according to the monitor system 100 in the exemplary embodiment, monitor load does not concentrate on a specific monitor server and if the installation number of terminals 103 in the LAN increases, load on the monitor server 501 does not increases. The terminals 103 and the monitor servers 501 are provided in a one-to-one correspondence and the security between the terminal 103 and the monitor server 501 improves as compared with that of the related art.

The invention is not limited to the exemplary embodiment described above and various modifications are possible. For example, the configuration may be replaced with the substantially same configuration as the configuration shown in the exemplary embodiment described above, the configuration for producing the same function and effect as the configuration shown in the exemplary embodiment described above, or the configuration capable of accomplishing the same object as the configuration shown in the exemplary embodiment described above.

[Second Exemplary Embodiment]

A second exemplary embodiment of the invention differs from the first exemplary embodiment of the invention in that a management server 151 corresponding to a high-rank server of a monitor server 501, having a function of managing one or more monitor servers 501 created corresponding to one LAN is generated. Similar points to those of the first exemplary embodiment will not be discussed again.

A storage section 303 of a monitor portal 104 in the second exemplary embodiment further stores a program to function as the management server 151 of the corresponding virtual server 105.

As shown in FIG. 14, for example, the storage section 303 stores an IP network address and an IP host address of a terminal 103, a server address of a virtual server 105 generated corresponding to the terminal 103, and a server address of the monitor server 501 corresponding to the virtual server 105 in a table format. For simplicity of the description, the case where the management server 151 is installed every two virtual servers 105 is assumed. However, the management server 151 may be installed every different number of virtual servers 105 or for each managed LAN.

A determination section 308 of the monitor portal 104 in the exemplary embodiment has a function of determining whether or not the management server 151 is generated about the LAN where the terminal 103 is installed as described later in addition to the function of the determination section 308 in the first exemplary embodiment.

The generated management server 151 transmits, for example, a manager command execution command, etc., to one or more virtual servers 105 under the management in accordance with the program, and the virtual server 105 adds a server certificate to the command and transmits to the corresponding terminal 103. The management server 151 manages one or more virtual servers 105 under the management in accordance with the program. Therefore, information of the same group, for example, information of the group for monitoring the same LAN and information of the terminal 103, for example, state information are reported and collected in the management server 151.

The manager command execution command corresponds to a command for turning off power of all terminals 103 installed in a LAN from 11 p.m to 8 a.m on the next day if the terminals belonging to the LAN are used only from 8 a.m to 11 p.m, for example.

Figure 15:
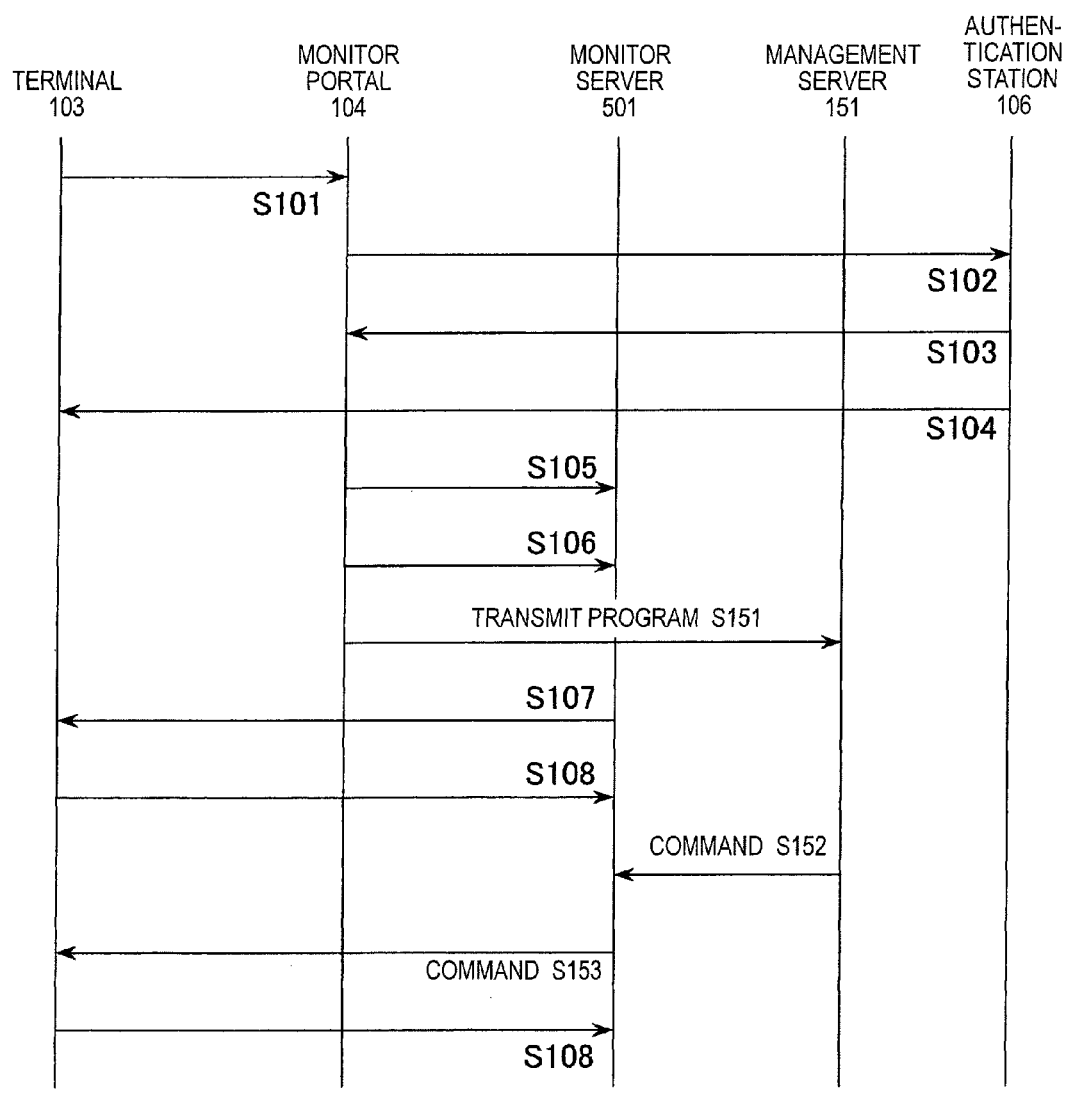
FIG. 15 is a drawing to describe an outline of a sequence as the whole monitor system in the second exemplary embodiment of the invention.

Next, an outline of a sequence as the whole monitor system 100 in the second exemplary embodiment will be discussed with FIG. 15. A sequence of S101 to S108 in FIG. 15 is similar to that of the second exemplary embodiment and therefore will not be discussed again.

After S106, the monitor portal 104 transmits a program for causing the virtual server 105 assigned as the management server 151 retained in the storage section 303 to function as the management server 151 (S151).

When the management server S1 executes a command, the management server 151 transmits the command to one or more monitor servers 501 under management. Next, the monitor server 501 adds the command to the server certificate and transmits the server certificate to the corresponding terminal 103 (S153). The terminal 103 authenticates the server certificate. If the server certificate is valid, the terminal 103 executes the command.

The processing at S107 and S108 may be repeated. The processing at S152 and S153 may also be repeated. The processing may be performed by asynchronous communications by so-called Comet, for example, and only when a change occurs in the terminal 103, response may be made (S108).

Figure 16:
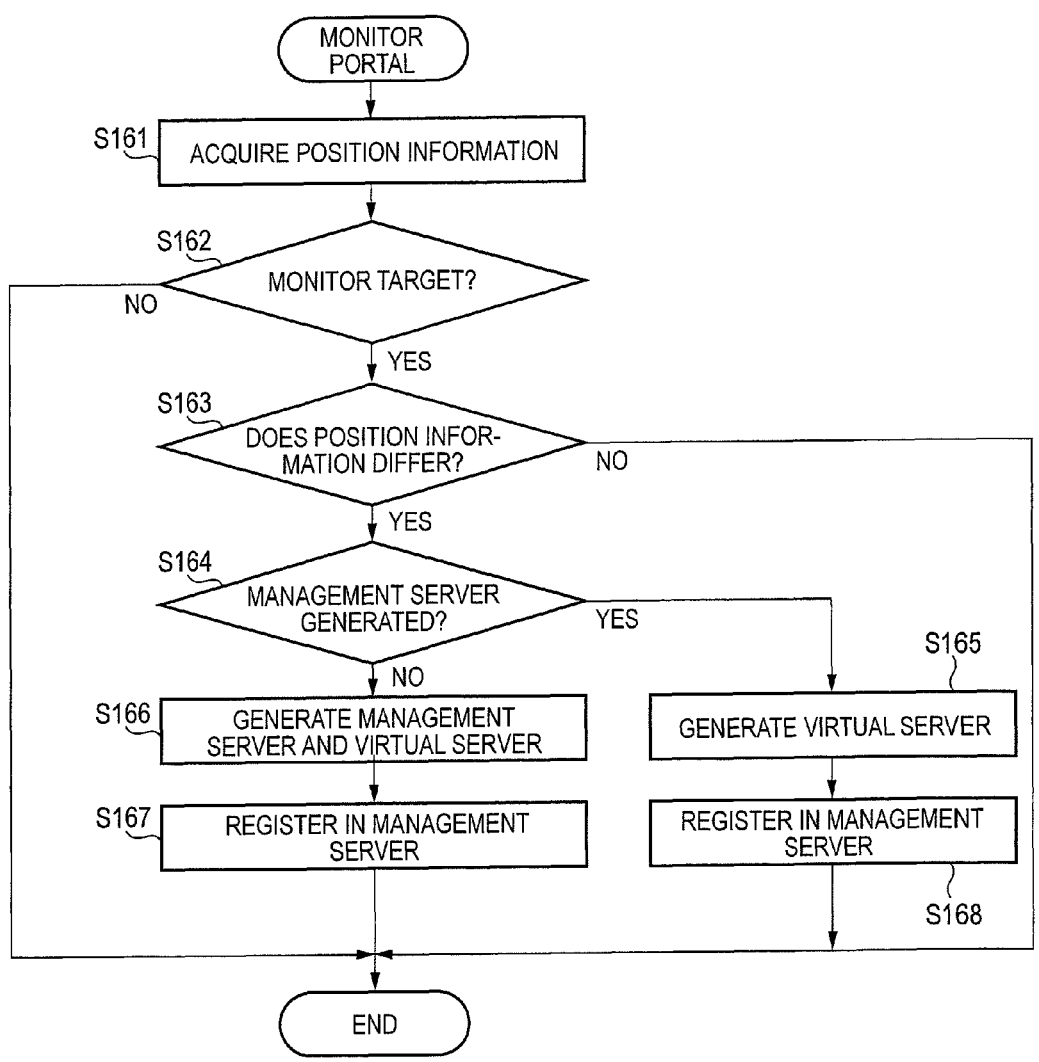
FIG. 16 is a flowchart to describe a flow of a monitor portal in the second exemplary embodiment of the invention.

The processing flow of the monitor portal 014 in the exemplary embodiment will be discussed in more detail with FIG. 16. As shown in FIG. 16, first a position information acquisition section 301 acquires position information of a newly installed terminal 103 (S161).

The determination section 308 determines whether or not the terminal 103 is in the network wherein the terminal is registered as a monitor target (S162).

If the terminal 103 is in the network wherein the terminal is registered as a monitor target, further the determination section 308 determines whether or not position information of the terminal 103 differs, namely, whether or not the IP host address of the terminal 103 is an already registered address (S163).

If the IP host address differs, for example, the table shown in FIG. 14 is referenced and further whether or not the management server is already generated is determined (S164). In the example shown in FIG. 14, the address of the management server 151 is not stored about acquired IP host address c of the terminal 103 and thus it is determined that the management server 151 is not generated.

If the management server 151 already exists, a virtual server is generated and the virtual server 105 is registered in the management server 151 as a monitor target (S165 and S168). The server address of the generated virtual server 105 in the management server 151 is stored in the storage section 303. In the example shown in FIG. 14, the address of the management server 151 is already registered about IP host address b and thus the virtual server 105 of server address Y is generated and the server address Y is registered. At S165, when the virtual server 105 is generated, a program for causing the virtual server 105 to function as the monitor server 501 and the virtual server 105 installs the program in a similar manner to that of the first exemplary embodiment and therefore will not be discussed again.

On the other hand, if the management server 151 does not exist, the management server 151 is generated and the virtual server 105 is also generated (S166). Specifically, the command section 302 commands the virtual server control section 201 to generate the virtual server 105 as described above. The virtual server 105 is registered as the monitor target of the generated management server 151.

In the example shown in FIG. 14, the address of the management server 151 is not stored about the IP host address c and thus, for example, the virtual server 105 of a new server address Z is generated and the management server 151 of a new server address Y is generated. At this time, a server address Z for managing the virtual server 105 of the server address Z is registered in the management server 151 of the address Y and the address is stored in the table format shown in FIG. 14, needless to say.

As described above, the management server 151 of the high-rank server for managing a predetermined number of monitor servers 501 is installed and information of the management server 151 or plural of monitor servers 501 is collected. Therefore, management of the monitor servers in a wide range at the in-enterprise level, at the enterprise-to-enterprise level, etc., is realized.

The invention is not limited to the exemplary embodiment described above and various modifications are possible. For example, the configuration may be replaced with the substantially same configuration as the configuration shown in the exemplary embodiment described above, the configuration for producing the same function and effect as the configuration shown in the exemplary embodiment described above, or the configuration capable of accomplishing the same object as the configuration shown in the exemplary embodiment described above. Each of the flows of the sections described above may be executed in a different order so long as the same function and effect and object as the flow shown in the exemplary embodiment described above are accomplished.

[Third Exemplary Embodiment]

A third exemplary embodiment of the invention differs from the first exemplary embodiment described above in that one monitor server 501 is generated about plural of terminals 103. Points similar to those of the first exemplary embodiment will not be discussed again.

Figure 17:
FIG. 17 is a drawing to describe a format stored in storage means in a third exemplary embodiment of the invention.

In the third exemplary embodiment, a storage section 303 of a monitor portal 104 stores the IP network address of a LAN to be monitored, the IP host address of a terminal 103, the server address of a virtual server 105 generated corresponding to the terminal 103, and the server address of a management server 151 corresponding to the virtual server 105 in a table format, for example, as shown in FIG. 17.

Specifically, the storage section 303 stores server address X of the same virtual server 105 in association with plural of IP host addresses (a and b) belonging to LAN A to generate one virtual server 105 about plural of terminals 103, for example, as shown in FIG. 17.

Further, although not shown in FIG. 17, the storage section 303 retains the number of terminals 103 assigned to one virtual server 105 (which will be hereinafter referred to as "specification number"). In the description of the exemplary embodiment, the case where the specification number is two is assumed, but a different specification number may be used, needless to say.

A determination section 308 of the monitor portal 104 in the exemplary embodiment determines whether or not the number of terminals 103 assigned to the virtual server 105 at present reaches the specification number as described later in addition to the function of the determination section 308 in the first exemplary embodiment.

Next, an outline of a processing sequence of a monitor system 100 in the exemplary embodiment will be discussed with FIGS. 18. S101 to S108 are similar to those of the first exemplary embodiment and therefore will not be discussed again. For simplicity of the exemplary embodiment, the case where terminals 103A and 103B are assigned to one virtual server 105 will be discussed.

Figure 18:
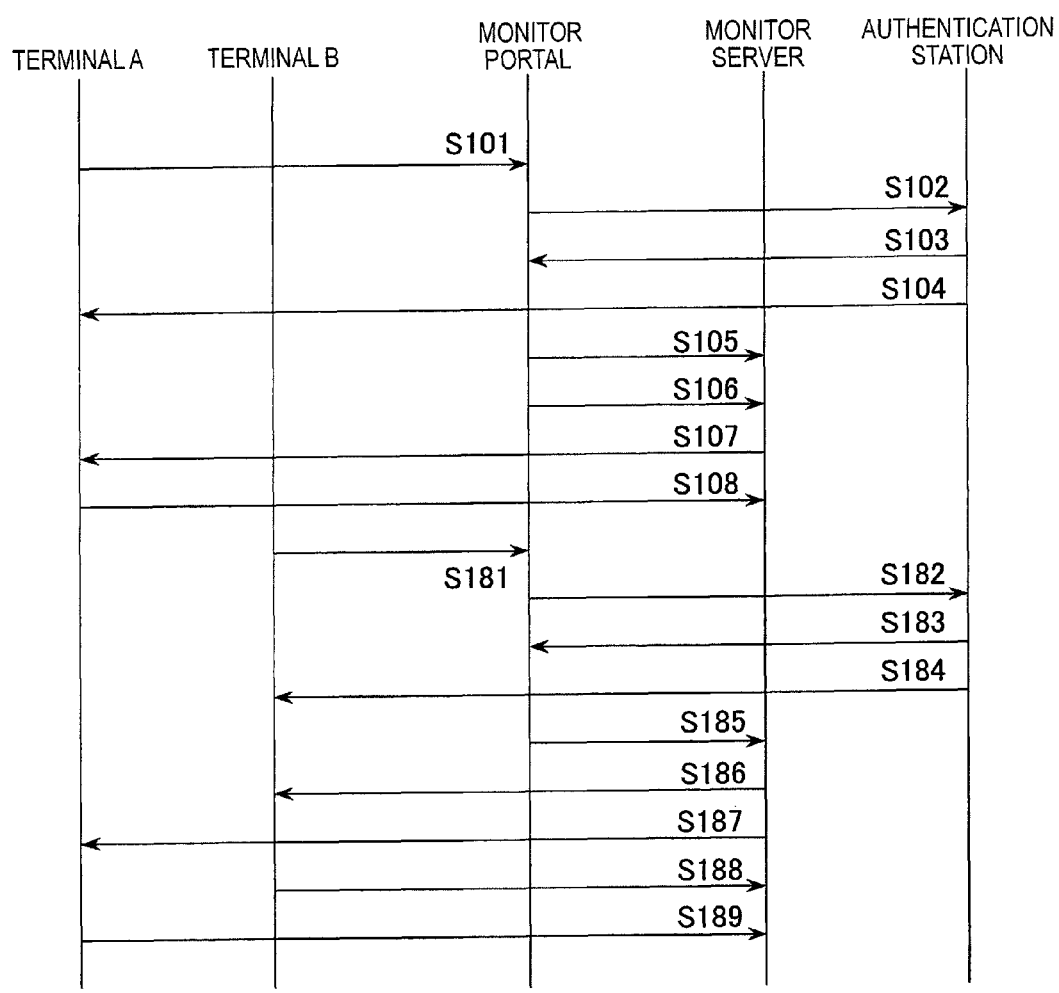
FIG. 18 is a drawing to describe an outline of a processing sequence of a monitor system in the third exemplary embodiment of the invention.

As shown in FIG. 18, first, similar processing to that of the first exemplary embodiment is performed for the terminal 103A (S101 to S108).

When connection of the terminal to LAN is detected, the terminal 103B transmits a client certificate B retained in the terminal 103B and position information of the terminal 103B to the monitor portal 104 (S181). A client certificate A of the terminal 103A differs from the client certificate B of the terminal 103B, needless to say.

Upon reception of the client certificate B, the monitor portal 104 requests an authentication station 106 to issue a server certificate B (S182). At this time, the monitor portal 104 requests the authentication station 106 to issue the server certificate based on certificate application data B provided by adding the client certificate B to certificate application data A concerning the terminal 103A. The certificate application data A concerning the terminal 103A is stored in the storage section 303, for example.

Upon reception of an issuance request of the server certificate B, the authentication station 106 transmits the server certificate B to the monitor portal 104 (S183). Specifically, an electronic signature is placed on the certificate application data B received from the monitor portal 104 using a private key of the authentication station 106. The server certificate B on which the signature is placed is transmitted to the monitor portal 104. This means that the server certificate B has the signature of the authentication station 106 in addition to the certificate application data B. Specific processing of the signature except that the certificate application data B contains the client certificate B is similar to that of the first exemplary embodiment and therefore will not be discussed again.

The authentication section 106 transmits a public key of the authentication section 106 to the terminal 103B (S184).

Upon reception of the new server certificate B, the monitor portal 104 updates the server certificate A retained in the storage section 303 to the server certificate B and transmits the server certificate B to the monitor server 501 (S185).

The virtual server 105 transmits the server certificate B to the terminals 103A and 103B and requests the terminal 103 to transmit the state of each of the terminals 103A and 103B (S186 and S187). The terminals 103A and 103B authenticate the server certificate B. If each of the terminals 103A and 103B determines that the server certificate B is valid, it transmits a state signal representing the state of the terminal 103 to the virtual server 105 (S188).

The processing at S107 and S108 may be repeated before S181. The processing may be performed by asynchronous communications by so-called Comet, for example, and only when a change occurs in the terminal 103, response may be made (S188 and S189).

Next, the processing described above will be discussed in more detail with reference to flows of the monitor portal 104, the terminal 103, the monitor server 501, and the authentication station 106. Each of the flows described later may be executed in a different order so long as the same function and effect and object as the flow described later are accomplished, needless to say.

Figure 19:
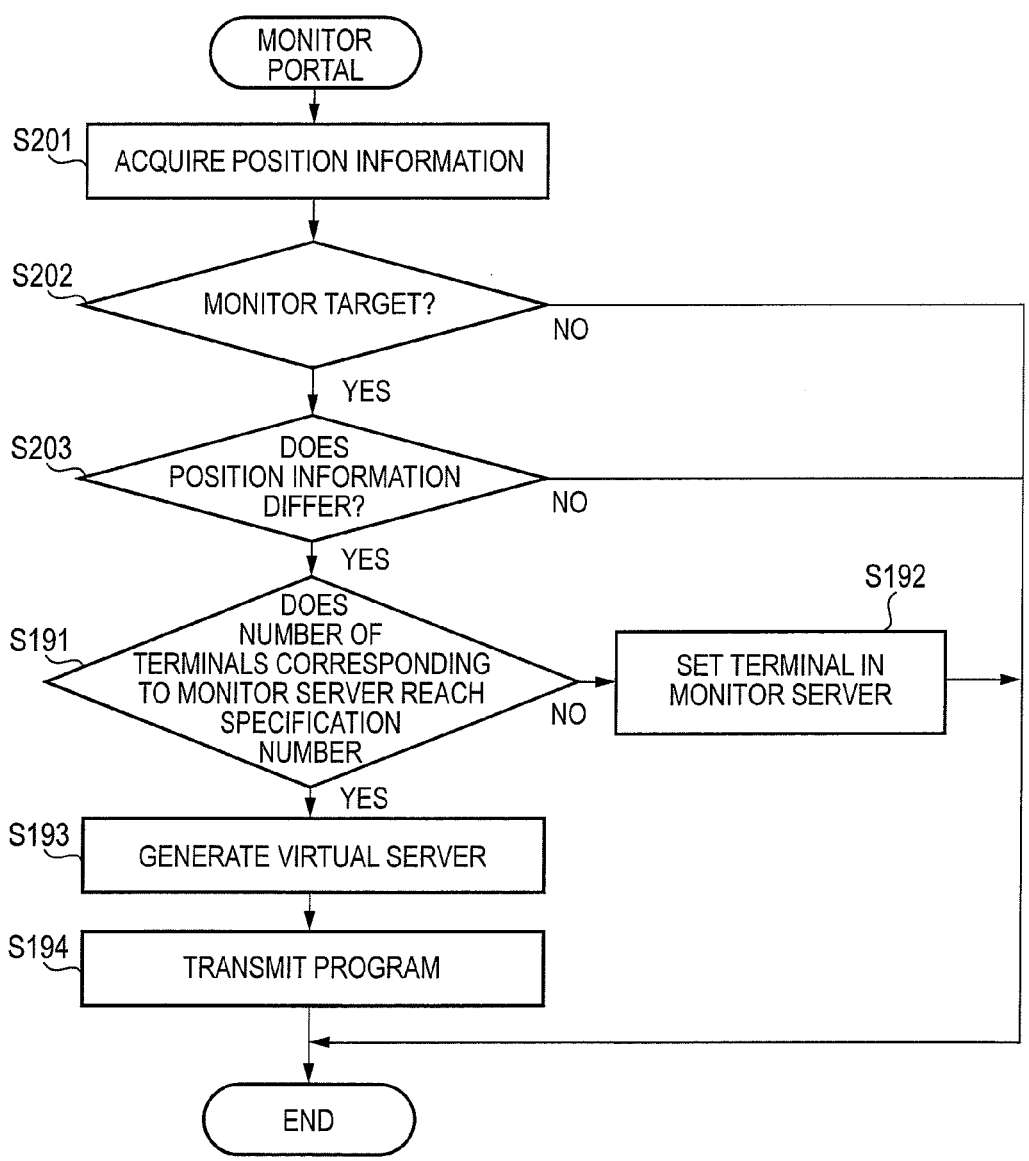
FIG. 19 is a flowchart to describe a processing flow of a monitor portal in the third exemplary embodiment of the invention.

A processing flow of the monitor portal 104 in the exemplary embodiment will be discussed in more detail with FIGS. 19. S201 to S203 are similar to those described above and therefore will not be discussed again.

If the determination section 308 determines at S203 that position information differs, the determination section 308 determines whether or not the number of terminals 103 corresponding to the monitor server 501 reaches the specification number (S191). The section having the function corresponding to S191, for example, corresponds to a number-of-terminals determination section in Claims and is implemented as the function of the determination section 308.

If it is determined that the specification number is not reached, setting is made so as to monitor the terminal 103 by the monitor server 501 (S192). Using the example in FIG. 17, for the terminal 103 whose IP host address is f, one virtual server 105 is assigned as the virtual server 105 of server address Z and the specification number 2 is not reached and thus the virtual server 105 of the server address Z is assigned to the terminal 103 whose IP host address is f, and the virtual server 105 monitors the terminal 103.

On the other hand, if it is determined that the specification number is reached, a virtual server control section 201 is commanded to generate a new virtual server 105, and a program for causing the virtual server 105 to function as the monitor server 501 is transmitted to the server (S193 and S194). Using the example in FIG. 17, for the next detected terminal 103 (for example, it is assumed that the IP host address is g), two terminals 103 are assigned to the virtual server 105 of the server address Z and the specification number is reached. Thus, the virtual server control section 201 is commanded to generate a new virtual server 105, and a program for causing the virtual server 105 to function as the monitor server 501 is transmitted to the virtual server 105.

Figure 20:
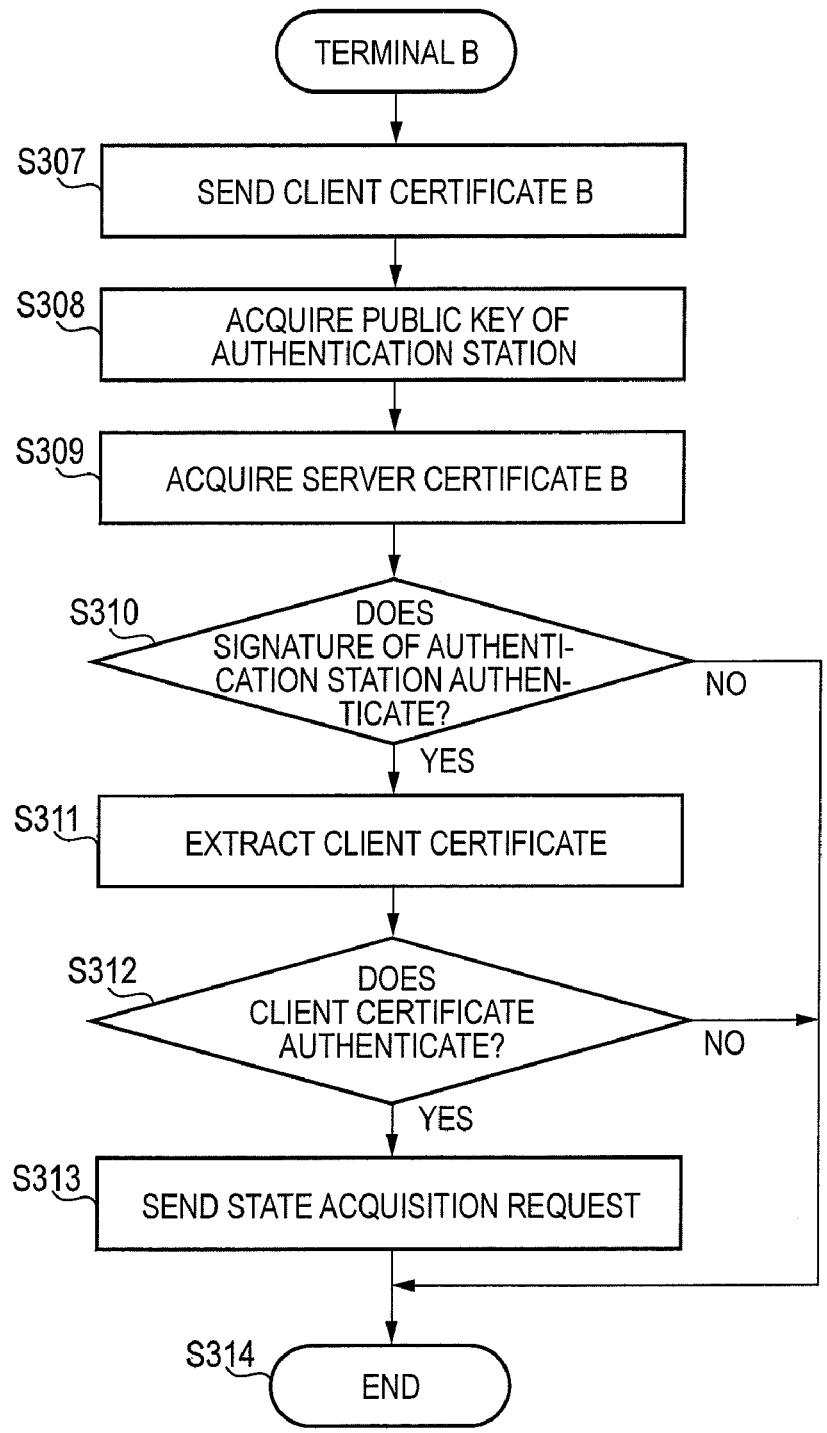
FIG. 20 is a flowchart to describe a processing flow concerning authentication of a terminal in the third exemplary embodiment of the invention.

Next, flows from the viewpoint of authentication in the exemplary embodiment will be discussed. FIG. 20 is a flowchart to describe a processing flow concerning authentication of the terminal 103 in the exemplary embodiment of the invention. Similar processing to the processing shown in FIG. 10 in the first exemplary embodiment is performed for the terminal 103A before the processing flow shown in FIG. 20. Here, for processing for the terminal 103A, the client certificate, the server certificate, and the certification application data in the first exemplary embodiment are referred to as client certificate A, server certificate A, and certification application data A.

Next, the terminal 103B transmits the client certificate B retained in a client certificate retention section 610 of the terminal 103B to the monitor portal 104 through a communication section 602 of the terminal 103B (S307).

A public key acquisition section 603 of the terminal 103B acquires the public key transmitted from the authentication section 106 through the communication section 602 of the terminal 103B (S308).

A server certificate acquisition section 307 of the terminal 103B acquires the server certificate B from the authentication station 106 through the communication section 602 (S309). At this time, the server certificate B may contain a request for acquiring the state of the terminal 103. It may also contain a command from the virtual server 105. In the exemplary embodiment, the server certificate B contains the client certificate A and the client certificate B.

A first authentication section 605 of the terminal B authenticates the signature of the authentication office 106 and determines whether or not the virtual server 105 transmitting the server certificate B is valid (S310). The detailed processing of the first authentication section 605 is similar to that of the first exemplary embodiment and therefore will not be discussed again. If it is determined that the virtual server 105 is not valid, the processing is terminated (S314).

On the other hand, if it is determined that the virtual server 105 is valid, the client certificate B corresponding to the terminal 103B is extracted (S311). In FIG. 20, the terminal 103B is the target and thus the virtual server 105 is valid, the client certificate B corresponding to the terminal 103B is extracted. However, if the terminal A is the target, the client certificate A corresponding to the terminal 103A is extracted, needless to say.

A second authentication section 609 authenticates the client certificate B contained in the server certificate B and determines whether or not the virtual server 105 is generated to monitor the terminal 103 (S312). That is, in FIG. 20, whether or not the client certificate B contained in the server certificate B matches the client certificate transmitted by the terminal 103B is determined.

If they match, it is determined that the virtual server 105 is generated to monitor the terminal 103B. A replay representing the state of the terminal 103B is made to the state acquisition request from the virtual server 105 (S313). If a command is contained, the command may be executed together with or in place of S206. Next, the processing is terminated (S314).

Processing about the terminal 103B has been described. Similar processing is performed for the terminal A. In this case, for the terminal 103A, sending the client certificate A, etc., is already performed and thus processing at 5309 to 5313 is performed, needless to say.

Figure 21:
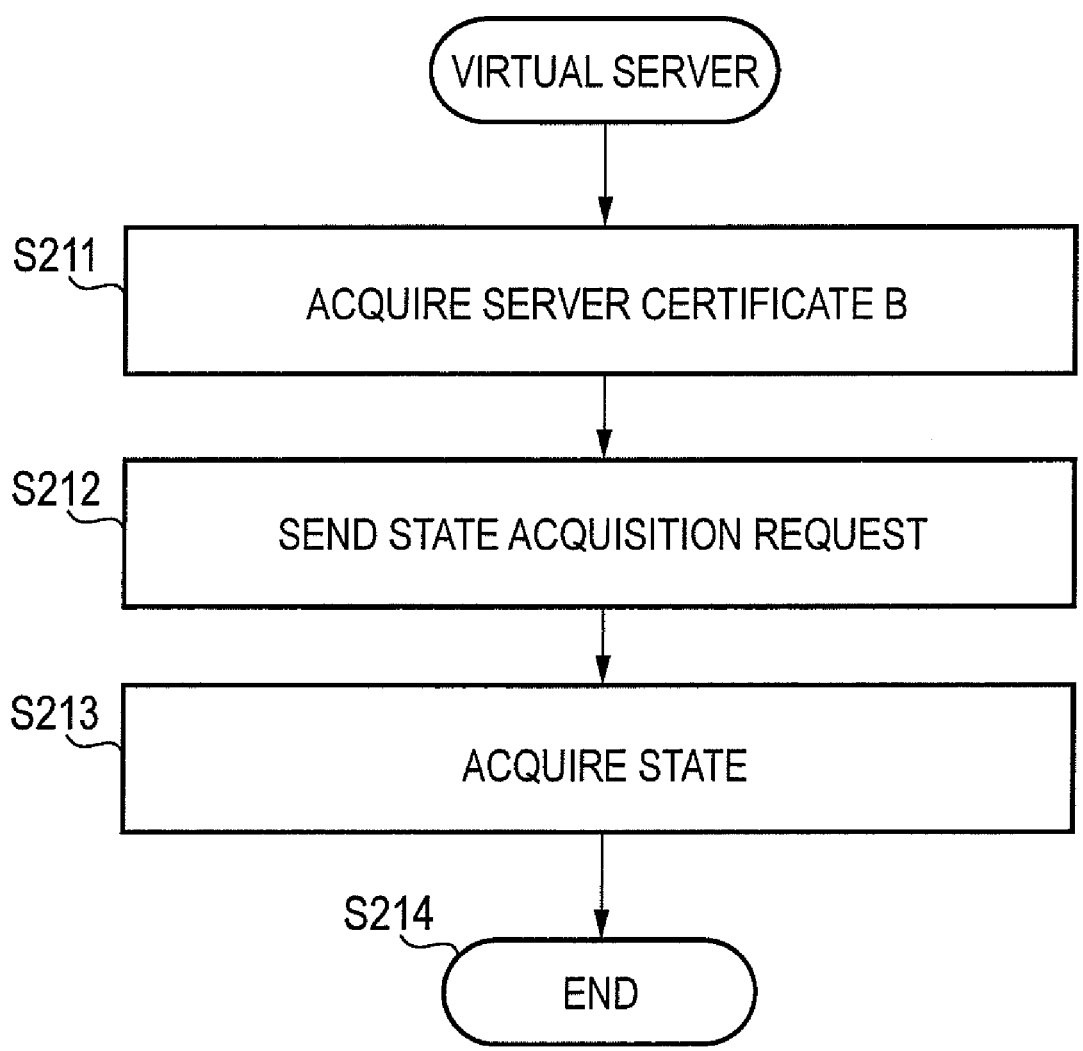
FIG. 21 is a flowchart to describe a processing flow concerning authentication of a virtual server in the third exemplary embodiment of the invention.

FIG. 21 is a flowchart to describe a processing flow concerning authentication of the virtual server 105. Since the monitor server 501 is already generated for the terminal B, the processing at S401 and 5402 shown in FIG. 11 in the first exemplary embodiment is not performed. For the terminal 103A, the corresponding monitor server 501 is not generated and thus similar processing to that of the first exemplary embodiment is performed needless to say.

As shown in FIG. 21, a server certificate acquisition section 502 acquires the server certificate B from the monitor portal 104 (S211).

The state acquisition request section 503 transmits a state acquisition request to the corresponding terminals 103A and 103B (S212). The server certificate B is added to the state acquisition request as described above.

A state acquisition section 504 acquires the state of the terminal 103A and the state of the terminal 103B transmitted from the terminals 103A and 103B (S213). The processing at S404 and S405 is repeated as described above. Next, the processing is terminated (S214).

Figure 22:
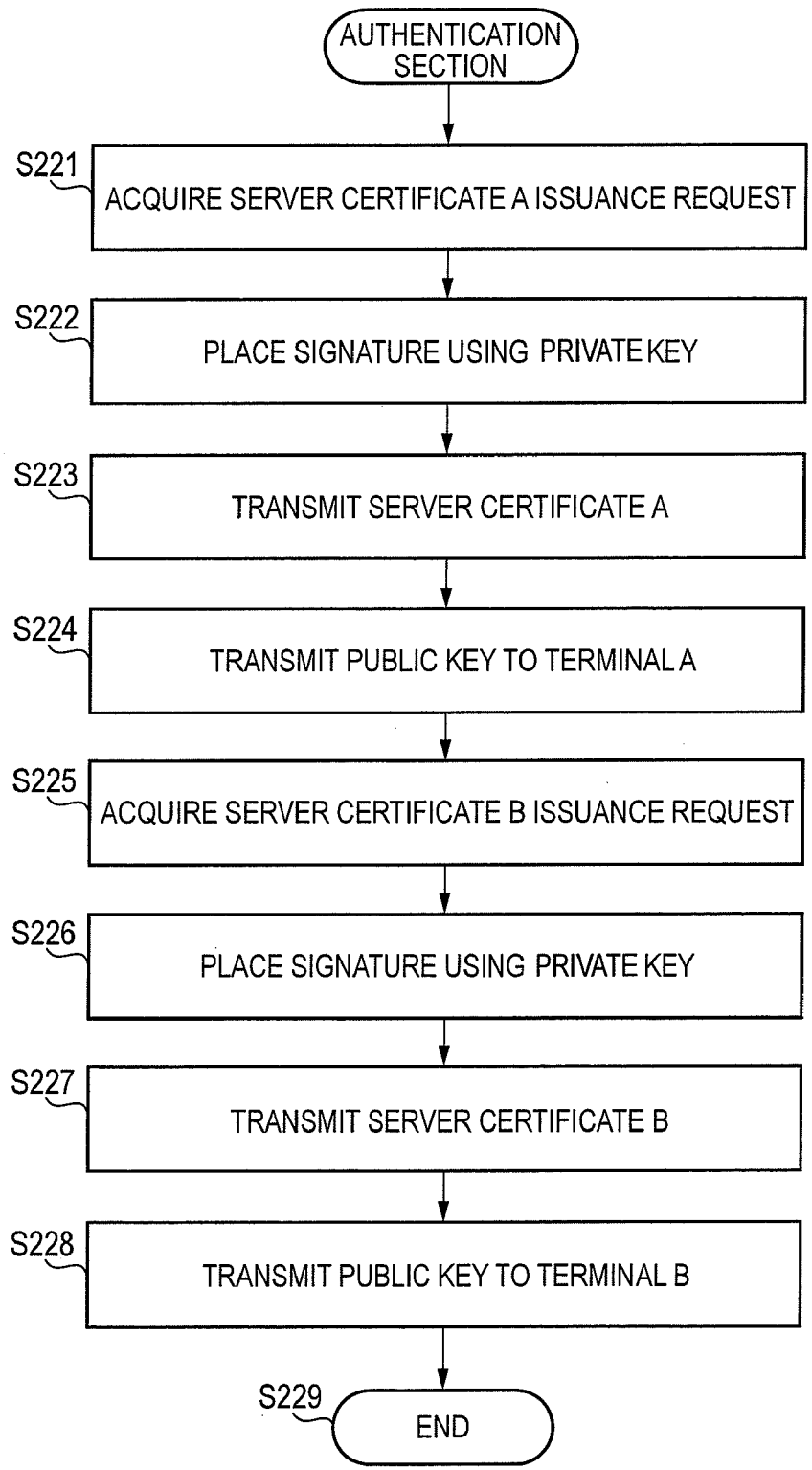
FIG. 22 is a flowchart to describe a processing flow of an authentication station concerning authentication in the third exemplary embodiment of the invention.

FIG. 22 is a flowchart to describe a processing flow of the authentication station 106 concerning authentication.

The authentication station 106 acquires a server certificate issuance request from the monitor portal 104 (S221). Specifically, a certificate application data acquisition section 701 acquires certificate application data A contained in the server certificate issuance request.

A digital signature is placed on the certificate application data A using the private key of the authentication station 106 and a server certificate A is generated (S222). Specifically, the digest acquired by a digest acquisition section 702 based on the certificate application data A is encrypted using the private key retained in the private key retention section 703, thereby generating the server certificate A.

The generated server certificate A is transmitted to the monitor portal 104 through a communication section 706 (S503). The public key retained in the public key retention section 704 is transmitted to the terminal 103 through the communication section 706 (S224).

Next, a server certificate issuance request concerning the terminal B is acquired from the monitor portal 104 (S225). Specifically, the certificate application data acquisition section 701 acquires certificate application data B contained in the server certificate issuance request.

A signature is placed on the certificate application data B using the private key of the authentication station 106 and a server certificate B is generated (S226). Specifically, the digest calculated and acquired by the digest acquisition section 702 based on the certificate application data B is encrypted using the private key retained in the private key retention section 703, thereby generating the server certificate B, as described above.

The generated server certificate B is transmitted to the monitor portal 104 through the communication section 706 (S227).

The public key retained in the public key retention section 704 is transmitted to the terminal 103B through the communication section 706 (S224). The processing is terminated.

Figure 23:
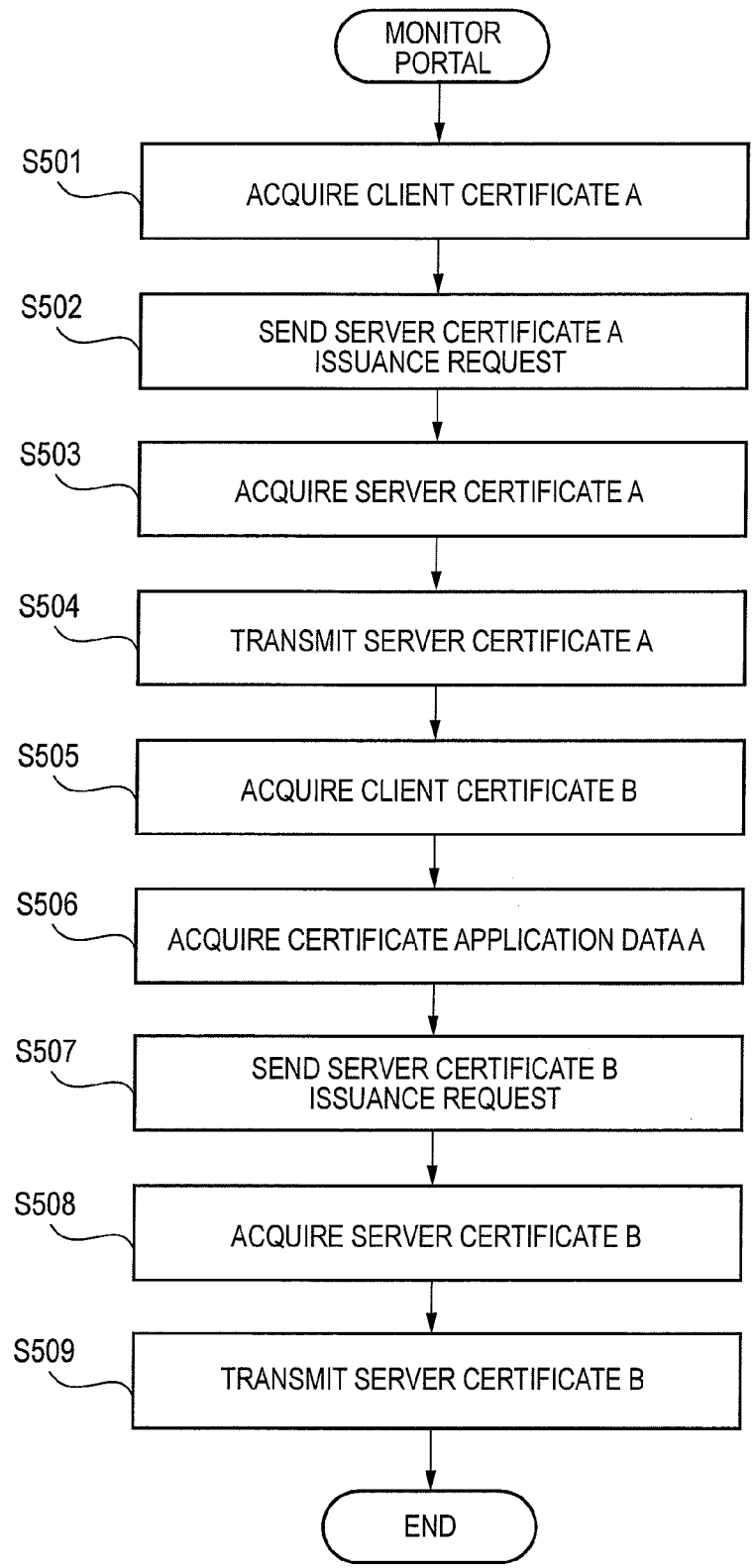
FIG. 23 is a flowchart to describe a processing flow of a monitor portal concerning authentication in the third exemplary embodiment of the invention.

FIG. 23 is a flowchart to describe a processing flow of the monitor portal 104 concerning authentication in the exemplary embodiment of the invention. The processing at S501 to S504 is similar to that of the first exemplary embodiment and therefore will not be discussed again. In the processing at S501 to S504, two terminals 103 will be discussed in the exemplary embodiment and therefore the client certificate, the server certificate, and certification application data at S501 to S504 are referred to as client certificate A, server certificate A, and certification application data A respectively.

After S504, a client certificate acquisition section 305 acquires client certificate B from the terminal 103B (S505).

The server certificate issuance request section 306 transmits the certificate application data B provided by adding the client certificate B to certificate application data A to the authentication station 106, thereby making a request for issuing the server certificate B (S506 and S507). It is assumed that the certificate application data A is retained in the storage section 303, for example.

The server certificate acquisition section 307 acquires the server certificate B issued by the authentication station 106 and transmits the server certificate to the virtual server 105 (S508 and S509). The virtual server 105 updates the retained server certificate A to the server certificate B and later monitors the terminals 103A and 103B using the server certificate B.

As described above, according to the monitor system 100 in the exemplary embodiment, monitor load does not concentrate on a specific monitor server and if the installation number of terminals 103 in the LAN increases, load on the monitor server 501 does not increases. The security between the terminal 103 and the monitor server 501 improves as compared with that of the related art.

The invention is not limited to the exemplary embodiment described above and various modifications are possible. For example, the configuration may be replaced with the substantially same configuration as the configuration shown in the exemplary embodiment described above, the configuration for producing the same function and effect as the configuration shown in the exemplary embodiment described above, or the configuration capable of accomplishing the same object as the configuration shown in the exemplary embodiment described above. Each of the flows of the sections described above may be executed in a different order so long as the same function and effect and object as the flow shown in the exemplary embodiment described above are accomplished. The second exemplary embodiment may be combined with the third exemplary embodiment for use. A transmission section described in Claims corresponds to the storage section 303 and the communication section 304, for example.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A monitor portal comprising:
a position information acquisition unit that acquires position information representing a position of a terminal connected to a communication network on the communication network;
a command unit that commands a virtual server control unit that generate a plurality of virtual servers from at least one physical server connected to the communication network and control the virtual servers to generate the virtual servers based on the position information;
a transmission unit that transmits a program for causing the virtual server to function as a monitor unit for acquiring a state signal from the terminal based on the position information to the virtual server so that the virtual server executes the program; and
a number-of-terminals determination unit that determines whether or not the number of terminals assigned to one of the virtual servers is a previously specified number,
wherein when the number of terminals is less than the specified number, the command unit commands the virtual server control means to generate the virtual server.

2. The monitor portal according to claim 1 wherein the monitor portal is one of the plurality of virtual servers.

3. The monitor portal according to claim 1 further comprising:
a storage unit that stores the position information of the terminal and a determination unit that determines whether or not the acquired position information differs from the stored position information of the terminal,
wherein if the determination unit determines that the acquired position information of the terminal differs from the stored position information of the terminal, the command unit commands the virtual server control means to generate the virtual server.

4. The monitor portal according to claim 1 wherein the command unit further commands the virtual server control means to generate a virtual management server of the virtual server for managing the virtual servers, and
wherein the transmission unit transmits a program to function as a management unit for transmitting a command to the terminal for management through the virtual server to the virtual management server.

5. The monitor portal according to claim 1 further comprising:
a client certificate acquisition unit that acquires a client certificate from the terminal; a server certificate issuance request unit that requests an authentication station to issue a server certificate containing the client certificate;
a server certificate acquisition unit that acquires the server certificate from the authentication station; and
a setting unit that sets the server certificate in the virtual server for storage.

6. The monitor portal according to claim 5 wherein the client certificate acquisition unit acquires a different client certificate from a different terminal, and
wherein the server certificate issuance request unit requests the authentication station to issue a server certificate containing the client certificate and the different client certificate.

7. A monitor system comprising:
a monitor portal including a position information acquisition unit that acquires position information representing a position of a terminal connected to a communication network on the communication network;
a command unit that commands a virtual server control unit that generates a plurality of virtual servers from at least one physical server connected to the communication network and control the virtual servers to generate the virtual servers based on the position information; and
a transmission unit that transmits a program for causing the virtual server to function as a monitor unit for acquiring a state signal from the terminal based on the position information to the virtual server so that the virtual server executes the program, and a terminal including an acquisition unit that acquires the server certificate from the virtual server;
a public key acquisition unit that acquires a public key from an authentication station;
a first authentication unit that authenticates the virtual server using the server certificate and the public key; and
a second authentication unit that authenticates the virtual server using a client certificate acquired from the virtual server.

8. A non-transitory computer readable medium storing a program causing a computer to execute a process, the process comprising:
acquiring position information representing a position of a terminal connected to a communication network on the communication network;
commanding a plurality of virtual servers from at least one physical server connected to the communication network and control the virtual servers to generate the virtual servers based on the position information;
transmitting a program for causing the virtual server to function as a monitor for acquiring a state signal from the terminal based on the position information to the virtual server so that the virtual server executes the program; and
determining whether or not the number of terminals assigned to one of the virtual servers is a previously specified number,
wherein when the number of terminals is less than the specified number, the command unit commands the virtual server control means to generate the virtual server.

9. The process according to claim 8 comprising: acquiring a client certificate from the terminal; requesting an authentication station to issue a server certificate containing the client certificate; acquiring the server certificate from the authentication station; and setting the server certificate in the virtual server for storage.

10. A non-transitory computer readable medium storing a program causing a computer to execute a process, the process comprising:
acquiring position information representing a position of a terminal connected to a communication network on the communication network;
commanding a plurality of virtual servers from at least one physical server connected to the communication network and control the virtual servers to generate the virtual servers based on the position information;
transmitting a program for causing the virtual server to function as a monitor for acquiring a state signal from the terminal based on the position information to the virtual server so that the virtual server executes the program;
acquiring the server certificate from the virtual server; acquiring a public key from an authentication station;
firstly authenticating the virtual server using the server certificate and the public key; and
secondly authenticating the virtual server using a client certificate acquired from the virtual server.

* * * * *